(12) United States Patent
Giannakis et al.

(10) Patent No.: US 7,561,613 B2
(45) Date of Patent: Jul. 14, 2009

(54) DIGITAL CARRIER MULTI-BAND USER CODES FOR ULTRA-WIDEBAND MULTIPLE ACCESS

(75) Inventors: Georgios B. Giannakis, Minnetonka, MN (US); Liuqing Yang, Gainesville, FL (US)

(73) Assignee: Regents of the University of Minnesota, Minneapolis, MN (US)

( * ) Notice: Subject to any disclaimer, the term of this patent is extended or adjusted under 35 U.S.C. 154(b) by 849 days.

(21) Appl. No.: 10/953,493

(22) Filed: Sep. 29, 2004

(65) Prior Publication Data

US 2005/0105588 A1   May 19, 2005

Related U.S. Application Data

(60) Provisional application No. 60/507,269, filed on Sep. 30, 2003.

(51) Int. Cl.
*H04B 1/00* (2006.01)
*H04N 7/12* (2006.01)
*H04J 11/00* (2006.01)
*H04W 4/00* (2009.01)

(52) U.S. Cl. .................. 375/134; 375/135; 375/136; 375/137; 375/130; 375/240.11; 375/295; 370/208; 370/329; 370/330

(58) Field of Classification Search ............... 375/135, 375/136, 137, 130, 240.11, 295; 370/208, 370/329, 330
See application file for complete search history.

(56) References Cited

U.S. PATENT DOCUMENTS

| | | | |
|---|---|---|---|
| 5,375,146 A | 12/1994 | Chalmers | |
| 6,834,073 B1 * | 12/2004 | Miller et al. | 375/130 |
| 6,959,032 B1 * | 10/2005 | Richards et al. | 375/138 |
| 7,031,371 B1 * | 4/2006 | Lakkis | 375/146 |
| 7,305,057 B1 | 12/2007 | Miao | |
| 2003/0108133 A1 | 6/2003 | Richards | |
| 2003/0147655 A1 * | 8/2003 | Shattil | 398/182 |
| 2004/0174770 A1 | 9/2004 | Rees | |
| 2004/0233858 A1 * | 11/2004 | Karaoguz | 370/254 |
| 2004/0233972 A1 * | 11/2004 | Karaoguz | 375/130 |
| 2005/0001684 A1 | 1/2005 | Braithwaite | |
| 2005/0141460 A9 * | 6/2005 | Currivan et al. | 370/335 |
| 2006/0285607 A1 | 12/2006 | Strodtbeck et al. | |

OTHER PUBLICATIONS

Z. Wang et al., "Block Precoding for MUI/ISI-Resilient Generalized Multicarrier CDMA with Multirate Capabilities," IEEE Transactions on Communications, vol. 49, No. 11, pp. 2016-2027, Nov. 2001.

(Continued)

*Primary Examiner*—David C Payne
*Assistant Examiner*—Linda Wong
(74) *Attorney, Agent, or Firm*—Shumaker & Sieffert, P.C.

(57) ABSTRACT

Techniques are described for generating digital carrier multi-band user codes for a baseband ultra-wideband (UWB) signal. The digital carrier multi-band user codes comprise spreading codes that enable multiple access in a UWB system. The user codes are digital, lead to baseband operation, and provide flexibility in handling narrow band interference (NBI) within the UWB system. In one embodiment, the invention provides a method comprising generating digital carrier multi-band user codes for a baseband ultra-wideband (UWB) signal of a user in an UWB system.

57 Claims, 11 Drawing Sheets

OTHER PUBLICATIONS

F. Ramirez-Mireles et al., "System Performance Analysis of Impulse Radio Modulation," Procedings Radio Wireless Conference, Colorado Springs, CO, pp. 67-70, Aug. 1998.

M. Win et al., "Ultra-Wide Bandwidth Time-Hopping Spread-Spectrum Impulse Radio for Wireless-Access Communications," IEEE Transactions on Communications, vol. 48, No. 4, pp. 679-691, Apr. 2000.

A. Saleh et al., "A Statistical Model for Indoor Multipath Propagation," IEEE Journal on Selected Areas in Communications, vol. SAC-5, No. 2, pp. 128-137, Feb. 1987.

B. Hassibi et al., "On the Expected Complexity of Sphere Decoding," Proceedings of the Asilomar Conference on Signals, Systems and Computers, vol. 2, pp. 1051-1055, 2001.

B. Hochwald et al., "Unitary Space-Time Modulation for Multiple-Antenna Communications in Rayleigh Flat Fading," IEEE Transactions on Information Theory, vol. 46, No. 2, pp. 543-564, Mar. 2000.

C. Le Martret et al., "All-Digital PPM Impulse Radio for Multiple-Access through Frequency-Selective Multipath," Procedures of GLOBECOM, vol. 1, pp. 22-26, San Francisco, CA, Nov. 17-Dec. 1, 2000.

C.J. Le Martret et al., "All-Digital Impulse Radio with Multiuser Detection for Wireless Cellular Systems," IEEE Transactions on Communications, vol. 50, No. 9, pp. 1440-1450, Sep. 2002.

C.J. Le Martret et al., "All-Digital PAM Impulse Radio for Multile-Access Through Frequency-Selective Multipath," Procedure of Sensor Array and Multichannel Signal Processing Workshop, Boston, pp. 77-81, Mar. 2000.

D. Cassioli et al., "Performance of Low-Complexity Rake Reception in a Realistic UWB Channel," 2002 IEEE International Conference on Communications, pp. 763-767, New York City, N.Y., Apr. 28-May 2, 2002.

E. Homier et al., "Rapid Acquisition of Ultra-Wideband Signals in the Dense Multipath Channel," G.E. Research Development Center, Technical Information Series, pp. 105-109, Jan. 2002.

F. Gini et al., "Frequency Offset and Symbol Timing Recovery in Flat-Fading Channels; A Cyclostationary Approach," IEEE Transactions On Communications, vol. 46, No. 3, pp. 400-411, Mar. 1998.

F. Ramirez-Mireles et al., "Multiple Access With Time-Hopping and Block Waveform PPM Modulation," 1998 IEEE International Conference on Communications, vol. 2 of 3, pp. 775-779, Atlanta, Georgia, Jun. 1998.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "AMOUR-Generalized Multicarrier Transceivers for Blind CDMA Regardless of Multipath," IEEE Transactions on Communications, vol. 48, No. 12, pp. 2064-2076, Dec. 2000.

H. Lee et al., "Multipath Characteristics of Impulse Radio Channels," 2000 IEEE 51st Vehicular Technology Conference Proceedings, Tokyo, Japan, pp. 2487-2491, May 15-18, 2000.

J.D. Choi et al., "Performance of Autocorrelation Receivers for Ultra-Wideband Communications with PPM in Multipath Channels," 2002 IEEE Conference on Ultra Wideband Systems and Technologies, pp. 213-217, Baltimore, MD, USA, May 2002.

J.D. Choi et al., "Performance on Ultra-Wideband Communications With Suboptimal Receivers in Multipath Channels," IEEE Journal on Selected Areas in Communications, vol. 20, No. 9, pp. 1754-1766, Dec. 2002.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.R. Foerster, "The Effects of Multipath Interference on the Performance of UWB Systems in Indoor Wireless Channel," IEEE VTS 53rd Vehicular Technology Conference, vol. 2, pp. 1176-1180, Rhodes, Greece, May 6-9, 2001.

J.R. Foerster et al., "Ultra-Wideband Technology for Short- or Medium-Range Wireless Communications," Ultra-Wideband Technology for Short- or Medium-Range Wireless Communications, pp. 1-11, 2001.

K.Siwiak et al., "Ultra-Wide Band Radio: The Emergence of An Important New Technology," IEEE VTS 53rd Vehicular Technology Conference, vol. 2, pp. 1169-1172, Rhodes, Greece, May 6-9, 2001.

L. Yang et al., "Multistage Block-Spreading for Impulse Radio Multiple Access Through ISI Channels," IEEE Journal on Selected Areas in Communications, vol. 20, No. 9, pp. 1767-1777, Dec. 2002.

L. Yang et al., "Space-Time Coding for Impulse Radio," 2002 IEEE Conference on Ultra Wideband Systems and Technologies, pp. 235-239, Baltimore, MN, May 20-23, 2002.

L. Yang et al., "Impulse Radio Muliple Access Through ISI Channels With Multi-Stage Block-Spreading" 2002 IEEE Conference on Ultra Wideband Systems and Technologies, pp. 277-281, Baltimore, MD, May 21-23, 2002.

L. Yang et al., "Optimal Pilot Waveform Assisted Modulation for Ultrawideband Communications," IEEE Transactions on Wireless Communications, vol. 3, No. 4, pp. 1236-1249, Jul. 2004.

L. Yang et al., "Non-Data Aided Timing Acquisition of Ultra-Wideband Transmissions Using Cyclostationarity," 2003 IEEE International Conference on Acoustics, Speech and Signal Processing, Hong Kong, vol. IV of VI, pp. IV-121-IV124, Apr. 6-10, 2003.

M.Z. Win et al., "Impulse Radio: How it Works," IEEE Communications Letters, vol. 2, No. 2, pp. 36-38, Feb. 1998.

M.L. Welborn, "System Considerations for Ultra-Wideband Wireless Networks," 2001 IEEE Radio and Wireless Conference, pp. 5-8, Boston, MA, Aug. 19-22, 2001.

M.Z. Win et al., "On the Energy Capture of Ultrawide Bandwidth Signals in Dense Multipath Environments," IEEE Communications Letters, vol. 2, No. 9, pp. 245-247, Sep. 1998.

M.Z. Win et al., "Ultra-Wide Bandwidth Time-Hopping Spread-Spectrum Impulse Radio for Wireless Multiple-Access Communications," IEEE Transactions on Communications, vol. 48, No. 4, pp. 679-691, Apr. 2000.

M.Z. Win et al., "Virtual Path Analysis of Selective Rake Receiver in Dense Multipath Channels," IEEE Communications Letters, vol. 3, No. 11, pp. 308-310, Nov. 1999.

M.Z. Win et al., "ATM-Based TH-SSMA Network for Multimedia PCS," IEEE Journal on Selected Areas in Communications, vol. 17, No. 5, pp. 824-836, May 1999.

O. Wintzell et al., "On the Capacity of a Pulse-Position-Hopped CDMA System," IEEE Transactions On Informaton Theory, vol. 47, No. 6, pp. 2639-2644, Sep. 2001.

P. Withington, II et al., "An Impulse Radio Communications Systems," Ultra-Wideband, Short-Pulse Electromagnetics, Brooklyn, NY, pp. 113-12, Oct. 1992.

R. Fleming et al., "Rapid Acquisition for Ultra-Wideband Localizers," 2002 IEEE Conference on Ultra Wideband Systems and Technologies, Balimore, MD, pp. 245-249, May 21-23, 2002.

R.A. Scholtz, "Multiple Access with Time-Hopping Impulse Modulation," Communications On The Move, Boston, MA, USA, pp. 447-450, Oct. 1993.

R.T. Hoctor et al., "An Overview of Delay-Hopped, Transmitted-Reference RF Communications," GE Research and Development Center, Technical Information Series, pp. 1-29, Jan. 2002.

S. Adireddy et al., "Optimal Placement of Training for Frequency-Selective Block-Fading Channels," IEEE Transactions Theory, vol. 48, No. 8, pp. 2338-2353, Aug. 2002.

S. Ohno et al., "Optimal Training and Redundant Precoding for Block Transmissions with Application to Wireless OFDM," IEEE Transactions on Communications, vol. 50, No. 12, pp. 2113-2123, Dec. 2002.

S. Zhou et al., "Space-Time Coding with Maximum Diversity Gains Over Frequency-Selective Fading Channels," IEEE Signal Processing Letters, vol. 8, No. 10, pp. 269-272, Oct. 2001.

S. Zhou et al., "Chip-Interleaved Block-Spread Code Division Multiple Access," IEEE Transactions on Communications, vol. 50, No. 2, pp. 235-248, Feb. 2002.

S.M. Alamouti, "A Simple Transmit Diversity Technique for Wireless Communications," IEEE Journal On Selected Areas In Communications, vol. 16, No. 8, pp. 1451-1458, Oct. 1998.

S.S. Kolenchery et al., "A Novel Impulse Radio Network for Tactical Military Wireless Commuications," Procedures Milcom Conference, Bedford, MA, 7 pages, Oct. 1998.

S.S. Kolenchery et al., "Performance of Local Power Control in Peer-to-Peer Impulse Radio Networks With Bursty Traffic," IEEE Global Telecommunications Conference, vol. 2 of 3, Phoenix, AZ, USA, pp. 910-916, Nov. 3-8, 1997.

U. Fincke et al., "Improved Methods For Calculating Vectors of Short Length in a Lattice, Including a Complexity Analysis," Mathematics of Computation, vol. 44, No. 170, pp. 463-471, Apr. 1985.

V. Lottici et al., "Channel Estimation for Ultra-Wideband Communications," IEEE Journal on Selected Areas in Communications, vol. 20, No. 9, pp. 1638-1645, Dec. 2002.

V. Tarokh et al., "Space-Time Block Codes From Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, vol. 44, No. 2, pp. 744-765, Mar. 1998.

W.M. Lovelace et al., "The Effects of Timing Jitter on the Performance of Impulse Radio," 2002 IEEE Conference on Ultra Wideband Systems and Technologies, pp. 251-254, Baltimore, MD, May 21-23, 2002.

X. Chen et al., ":Monocycle Shapes for Ultra Wideband System," 2002 IEEE International Symposium on Circuits and Systems, vol. I of V, pp. I-597-I-600, Scottsdale, AZ, May 25-29, 2002.

Z. Tian et al., "Symbol Timing Estimation in Ultra-Wideband Communications," Procecures of $36^{th}$ Asilomar Conference on Signals, Systems, and Computers, Pacific Grove, CA, pp. 1924-1928, Nov. 3-6, 2002.

Z. Wang et al., "Wireless Multicarrier Communications: Where Fourier Meets Shannon," IEEE Signal Processing Magazine, vol. 47, No. 3, pp. 1-21, May, 2000.

Z. Wang et al., "Vandermonde-Lagrange Mutually Orthogonal Flexible Transceivers for Blind CDMA in Unknown Multipath," Procedures of Workshop on Signal Processing Advances in Wireless Communication, Annapolis, MD, pp. 42-45, May 9-12, 1999.

B. Parr et al., "A Novel Ultra-Wideband Pulse Design Algorithm," IEEE Communications Letter, vol. 7, No. 5, pp. 219-221, May 2003.

J. Romme et al., "On the Power Spectral Density of Time-Hopping Impulse Radio," 2002 IEEE Conference on Ultra-Wideband Systems and Technologies, Wyndham Baltimore Inner Harbor, pp. 241-244, May 2002.

M.Z. Win, "Spectral Density of Random UWB Signals," IEEE Communications Letters, vol. 6, No. 12, pp. 526-528, Dec. 2002.

J. Han et al., "A New Ultra-Wideband, Ultra-Short Monocycle Pulse Generator with Reduced Ringing," IEEE Microwave and Wireless Components Letters, vol. 12, No. 6, pp. 206-208, Jun. 2002.

J.S. Lee et al., "New Uniplanar Subnanosecond Monocycle Pulse Generator and Transformer for Time-Domain Microwave Applications," IEEE Transactions on Microwave Theory and Techniques, vol. 49, No. 6, pp. 1126-1129, Jun. 2001.

T.W. Parks et al., "Chebyshev Approximation for Nonrescursive Digital Filters with Linear Phase," IEEE Transactions on Circuit Theory, vol. CT-19, No. 2, pp. 189-194, Mar. 1972.

D. Kelly et al., "PulsON Second Generation Timing Chip: Enabling UWB Through Precise Timing," 2002 IEEE Conference on Ultra-Wideband Systems and Technologies, Wyndham Baltimore Inner Harbor, pp. 117-121, May 2002.

X. Luo et al., "Designing Optimal Pulse-Shapers for Ultra-Wideband Radios," Journal of Communications and Networks, vol. 5, No. 4, pp. 344-353, Dec. 2003.

J.R. Foerster, "The Performance of a Direct-Sequence Spread Ultra-Wideband System in the Presence of Multipath, Narrowband Interference, and Multiuser Interference," 2002 IEEE Conference on Ultra Wideband Systems and Technologies, Wyndham Baltimore Inner Harbor, pp. 87-92, May 2002.

B.M. Sadler et al., "On the Performance of UWB and DS-Spread Spectrum Communications Systems," 2002 IEEE Conference on Ultra Wideband Systems and Technologies, Wyndham Baltimore Inner Harbor, pp. 289-292, May 2002.

R.A. Scholtz, "Multiple Access with Time-Hopping Impulse Modulation," Communications on the Move, Conference Record vol. 2 of 3, MILCOM Conference, Boston, MA, pp. 447-450, 1993.

Z. Wang, "Multi-Carrier Ultra-Wideband Multiple-Access with Good Resilience Against Multiuser Interference," 2003 Conference on Information Sciences & Systems, The Jon Hopkins University, Baltimore, MD, pp. 1-5, Mar. 2003.

D. Cassioli, et al., "Performance of Low-Complexity Rake Reception in a Realistic UWB Channel," 2002 IEEE International Conference on Communications, New York, NY, pp. 763-767, Apr. 28-May 2, 2002.

Z. Wang et al., "A Simple and General Parameterization Quantifying Performance in Fading Channels," IEEE Transactions on Communications, vol. 51, No. 8, pp. 1389-1398, Aug. 2003.

L. Yang et al., "Analog Space-Time Coding for Multiantenna Ultra-Wideband Transmissions," IEEE Transactions on Communications, vol. 52, No. 3, pp. 507-517, Mar. 2004.

I. Bergel et al., "Narrow-Band Interference Suppression in Time-Hopping Impulse-Radio Systems," 2002 IEEE Conference on Ultra Wideband Systems and Technologies, Wyndham Baltimore Inner Harbor, pp. 303-307, May 2002.

L. Yang et al., "Unification of Ultra-Wideband Multiple Access Schemes and Comparison in the Presence of Interference," The Thirty-Seventh Asilomar Conference on Signals, Systems & Computers, Pacific Grove, CA, pp. 1239-1243, Nov. 2003.

G. Durisi, et al., "Performance of TH and DS UWB Multiaccess Systems in Presence of Multipath Channel and Narrowband Interference," Procedure of International Workshop on Ultra Wideband Systems, Oulu, Finland, 5 pages, Jun. 2003.

Z. Wang et al., "Complex-Field Coding for OFDM Over Fading Wireless Channels," IEEE Transactions on Information Theory, vol. 49, No. 3, pp. 707-720, Mar. 2003.

A.V. Oppenheim, et al., *Discrete-Time Signal Processing*, $2^{nd}$ Edition, Prentice Hall, Chapter 7, "Optimum Approximations of Fir Filters," pp. 486-511, 1999.

FCC Report and Order, *In the Matter of Revision of Part 15 of the Commision's Rules Regarding Ultra-Wideband Transmission Systems*, FCC 02-48, pp. 7434-7553, Apr. 2002.

IEEE P802.15 Working Group for WPAN, *Channel Modeling Sub-Committee Report Final*, IEEE 802.15-02/368r5-SG3a, pp. 1-40, Nov. 2002.

L. Yang et al., "Digital-Carrier Multi-Band User Codes for Baseband UWB Multiple Access," Journal of Communications and Networks, vol. 5, No. 4, pp. 374-385, Dec. 2003.

M. Hamalainen et al., "On the UWB System Coexistence With GSM900, UMTS/WCDMA, and GPS," IEEE Journal on Selected Areas in Communications, vol. 20, No. 9, pp. 1712-1721, Dec. 2002.

L. Zhao et al., "Performance of Ultra-Wideband Communications in the Presence of Interference," IEEE Journal on Selected Areas in Communications, vol. 20, No. 9, pp. 1684-1691, Dec. 2002.

S. Zhou et al., "Digital Multi-Carrier Spread Spectrum Versus Direct Sequence Spread Spectrum for Resistance to Jamming and Multipath," IEEE Transactions on Communications, vol. 50, No. 4, pp. 643-655, Apr. 2002.

P. Withington, "Impulse Radio Overview," Time Domain Corp., pp. 1-7, downloadable from http://user.it.uu.se/carle/Notes/UWB.pdf.

* cited by examiner

DIGITAL CARRIER MULTI-BAND USER CODES FOR ULTRA-WIDEBAND MULTIPLE ACCESS

This application claims the benefit of U.S. Provisional Application Ser. No. 60/507,269, filed Sep. 30, 2003, the entire content of which is incorporated herein by reference.

STATEMENT REGARDING FEDERALLY SPONSORED RESEARCH OR DEVELOPMENT

This invention was made with Government support under Contract No. 522-6505 awarded by Army Research Lab ARL/CTA, as Agency Grant No. DAAD19-01-2-0011. The Government may have certain rights in the invention.

TECHNICAL FIELD

The invention relates to wireless communication techniques and, in particular, techniques that employ ultra-wideband (UWB) communication.

BACKGROUND

Ultra-wideband (UWB) communication has attractive features for baseband multiple access, tactical wireless communications, and multimedia services. In general, an UWB transmission consists of a train of very short pulses occupying an ultra-wide bandwidth. The information is typically encoded via either linear pulse amplitude modulation (PAM) or nonlinear pulse position modulation (PPM). The ultra-wide bandwidth includes bandwidths that are licensed from the Federal Communication Commission (FCC) for other communication purposes. However, the short pulses of the UWB transmission appear as minimal noise to narrowband systems operating within those licensed frequencies.

Conveying information over ultra-short waveforms allows UWB systems to provide low-power low-complexity baseband operation, ample multipath diversity, and a potential to enhance user capacity. These features make UWB connectivity suitable for indoor and especially short-range high-rate wireless links in the workplace and at home. To achieve these features, UWB systems must be able to accommodate multiple users in the presence of narrowband interference (NBI) introduced by the overlaid existing narrowband systems.

UWB systems may rely on spreading schemes to enable multiple access. Existing baseband, i.e., carrier-less, spreading schemes rely on time-hopping (TH) or direct-sequence (DS) codes. These codes can lead to constant-modulus transmissions, but they are not substantially flexible in handling multi-user interference (MUI) and NBI with low-complexity receivers, which are two critical factors limiting performance of UWB systems in the presence of multipath and co-existing narrowband services.

SUMMARY

In general, techniques are described for generating digital carrier multi-band user codes for a baseband ultra-wideband (UWB) signal. The digital carrier multi-band user codes comprise spreading codes that enable multiple access in a UWB system. The user codes are digital, lead to baseband operation, and provide flexibility in handling narrow band interference (NBI) within the UWB system.

The user codes are generated based on digital carriers applied to discrete cosine or sine transforms. In some embodiments, the user codes comprise single carrier (SC) user codes in which each user is assigned a single digital carrier. In other embodiments, the user codes comprise multi-carrier (MC) user codes in which each user is assigned a combination of digital carriers. In either case, the digital carriers occupy multiple frequency bands within the transmission bandwidth. The user codes allow UWB transmissions to avoid NBI by simply nulling digital carriers that include NBI. In addition, the user codes may mitigate multi-user interference (MUI) with simple matched filtering operations.

In one embodiment, the invention is directed to a method comprising generating digital carrier multi-band user codes for a baseband ultra-wideband (UWB) signal of a user in a UWB system.

In another embodiment, the invention is directed to a computer-readable medium comprising instructions. The instructions when executed in a UWB transmitter generate digital carrier multi-band user codes for a baseband UWB signal of a user in an UWB system.

In a further embodiment, the invention is directed to an UWB transmitter comprising a user code generator. The user code generator generates digital carrier multi-band user codes for a baseband UWB signal of a user in an UWB system.

The invention may be capable of providing a number of advantages. For example, unlike orthogonal frequency division multiple access (OFDMA) in narrowband systems, the baseband SC and MC spreading codes are real. The resulting baseband transceivers are analog carrier-free, i.e., not modulated on a separate analog carrier signal, and are thus immune to analog carrier frequency offset arising from oscillator mismatch. As another example, UWB signaling with both the SC and MC spreading codes occupies multiple frequency bands, and the resulting multi-band transmission enjoys multipath diversity gains. In fact, both SC-UWB and MC-UWB codes enable full multipath diversity, whereas conventional direct sequence (DS)-UWB does not. In addition, MC-UWB codes can enable maximum coding gains.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
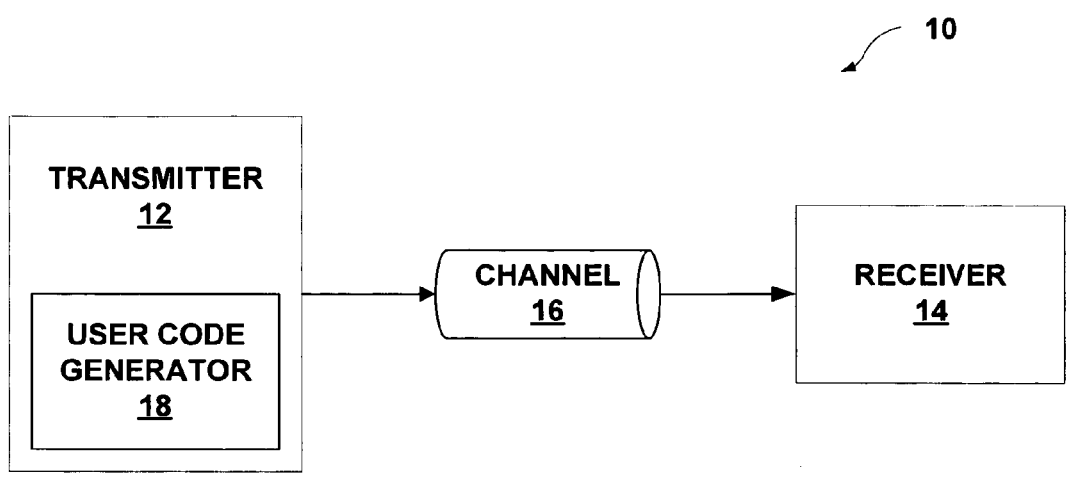
FIG. 1 is a block diagram illustrating an ultra wideband communication system.

FIG. 1 is a block diagram illustrating an ultra wideband (UWB) communication system 10 in which a transmitter 12 communicates with a receiver 14 through a wireless channel 16. UWB system 10 conveys information from transmitter 12 to receiver 14 over ultra-short waveforms. This allows UWB system 10 to include low-complexity baseband transceivers, ample multipath diversity, and a potential for major increases in user capacity. However, since UWB communication system 10 overlays existing narrowband systems, multiple access has to be achieved in the presence of narrowband interference (NBI). Therefore, transmitter 12 generates spreading codes that not only enable baseband UWB multiple access, but also facilitate flexible NBI cancellation.

Conventional baseband spreading schemes for multiple access UWB rely on time-hopping (TH), or direct-sequence (DS) codes. These codes can lead to constant-modulus transmissions, but they are not substantially flexible in handling multi-user interference (MUI) and NBI with low-complexity receivers. These are two critical factors limiting performance of UWB radios in the presence of multipath and co-existing narrowband services. In addition, DS-UWB is not capable of enabling full multipath diversity.

Transmitter 12 includes a user code generator 18 that generates digital carrier multi-band user codes for a baseband UWB signal of a user in UWB system 10. User code generator 18 constructs the user codes for each user in communication system 10 using a single digital carrier (SC) or multiple digital carriers (MC), which can be implemented with standard discrete cosine transform (DCT) circuits. The digital carrier multi-band user codes comprise spreading codes that enable multiple access in UWB system 10. The generated user codes can substantially eliminate NBI in the transmitted UWB signal by simply avoiding digital carriers residing on contaminated frequency bands. Being digital, the user codes give rise to a multi-band UWB system without invoking analog carrier signals, which require a local oscillator for modulation. The SC and MC spreading codes are also capable of reducing the number of interfering users, with simple matched filter operations.

Different from orthogonal frequency division multiple access (OFDMA) in narrowband systems, the baseband SC- and MC-UWB spreading codes described herein are real. The resulting baseband transceivers are analog carrier-free, i.e., not modulated on a separate analog carrier signal, and thus immune to analog carrier frequency offset arising from oscillator mismatch at transmitter 12 and receiver 14. UWB signaling with either the SC or the MC spreading codes occupies multiple frequency bands, and the resulting multi-band transmission enjoys multipath diversity gains. Both SC and MC user codes enable full multipath diversity, and the MC user codes enable maximum coding gains.

Transmitter 12 transmits the UWB signal of the user through communication channel 16 using one or more antennas. The UWB signal comprises a sequence of binary symbols represented by a train of ultra-short pulses. As an example, multi-access UWB system 10 may include $N_u$ users, where $s_u(n_s)$ denotes the $n_s$ information bearing symbol of user u. To transmit one binary symbol, $N_f$ ultra-short pulses p(t) of duration $T_p$ seconds are repeated over $N_f$ consecutive frames, one pulse per frame of duration $T_f$ seconds. The symbol transmitted during the kth frame can thus be written as $s_u(\lfloor k/N_f \rfloor)$. With symbol duration $T_s := N_f T_f$, the symbol rate is $R := 1/T_s$. With $T_p$ on the order of nanoseconds, the transmission is UWB with bandwidth $B \approx 1/T_p$. Using binary pulse amplitude modulation (PAM), the uth user's transmitted signal is $$x_u(t) = \sqrt{\frac{\varepsilon_u}{N_f}} \sum_{k=0}^{\infty} s_u\left(\left\lfloor \frac{k}{N_f} \right\rfloor\right) c_u(k) p(t - kT_f), \quad (1)$$

where $\varepsilon_u$ is the energy per symbol, and $c_u(k)$ denotes the spreading code of the uth user, $\forall u \in [0, N_u-1]$. User code generator 18 within transmitter 12 generates $c_u(k)$ to be either SC or MC user codes. The user codes will be periodic with period $N_f$, and with energy normalized so that $$\sum_{k=0}^{N_f-1} c_u^2(k) = N_f, \forall u \in [0, N_u - 1].$$

To reach receiver 14, the uth user's transmission propagates through multipath communication channel 16 with impulse response:

$$\sum_{l=a}^{L_u} \alpha_u(l) \delta(t - \tau_u(l)),$$

where $\{\alpha_u(l)\}_{l=0}^{L_u}$ and $\{\tau_u(l)\}_{l=0}^{L_u}$ are amplitudes and delays corresponding to a total of $L_u$ multipath returns. The continuous-time received waveform is then given by $$r(t) = \sum_{u=0}^{N_u-1} \sqrt{\frac{\varepsilon_u}{N_f}} \sum_{k=0}^{\infty} s_u\left(\left\lfloor \frac{k}{N_f} \right\rfloor\right) c_u(k) h_u(t - kT_f) + \eta(t) \quad (2)$$

where $$h_u(t) := \sum_{l=0}^{L_u} \alpha_u(l) p(t - \tau_u(l))$$

is the composite pulse-multipath channel 16 corresponding to user u, and η(t) is the aggregate noise including additive white Gaussian noise (AWGN), and possible NBI. After multipath propagation, each UWB pulse p(t) is time-dispersed to the waveform $h_u(t)$ of duration $\tau_u(L_u) + T_p$. To allow for high data-rates, the frame duration is chosen to satisfy: $T_f < \tau_u(L_u) + T_p$, which induces inter-frame interference (IFI).

Receiver 14 receives the transmitted UWB signal through communication channel 16 using one or more antennas. Receiver 14 correlates the estimate of channel 16 with received waveforms to produce estimate data, and then samples the estimate data to produce a data sequence upon which symbol detection is performed. Sampling may be performed at the frame-rate or integer multiple of the frame-rate of the UWB system 10.

After the channel has been estimated, RAKE reception may be adopted to collect the ample multipath diversity provided by channel 16 in UWB system 10. As an example, receiver 14 may comprise a RAKE receiver. RAKE receivers with L fingers sum up weighted outputs, i.e., diversity combining, from a bank of correlators. Let $\{\tau(l)\}_{l=1}^{L}$ denote the delays corresponding to the total of L RAKE fingers sorted in an increasing manner. The RAKE delays $\tau(l)$ are not necessarily equal to the channel delays $\tau_u(l)$. In order to collect energy from all fingers, the maximum delay $\tau(L)$ must not exceed the multipath delay spread. Furthermore, to collect samples at the frame rate, $\tau(L)$ is also confined by the frame duration $T_f$. As a result, the maximum RAKE finger delay is upper bounded by: $\tau(L) \leq \min\{T_f - T_p, \tau_\mu(L_\mu) + T_p\}$, where $\mu$ denotes the desired user. In practice, L and $\{\tau(l)\}_{l=1}^{L}$ can be either channel-dependent or fixed depending on error performance versus complexity tradeoffs. These tradeoffs lead to choices between all-RAKE, partial-RAKE, and selective-RAKE receivers.

During the kth frame, the correlator template for the lth RAKE finger is the pulse $p(t-kT_f-\tau(l))$. Accordingly, the correlator output is $$y(k;l) = \sum_{u=0}^{N_u-1} \sqrt{\frac{\varepsilon_u}{N_f}} \sum_{n=0}^{+\infty} \alpha_{u,l}(n) c_u(k-n) s_u\left(\left\lfloor \frac{k-n}{N_f} \right\rfloor\right) + \eta(k;l), \quad (3)$$

$$\forall l \in [1, L],$$

where $\eta(k;l)$ denotes the corresponding sampled noise. The correlation between the template waveform p(t) and the received waveform $h_u(t)$ is denoted as $$\rho_{u,h}(\tau) := \int_{\tau}^{\tau+T_p} p(t-\tau) h_u(t) dt$$

and $\alpha_{u,l}(n) := \rho_{u,h}(nT_f + \tau(l))$. Equation (3) represents the frame-sampled pulse-multipath-RAKE system model input-output (I/O) relationship in digital form. Using the definition of $\rho_{u,h}(\tau)$, it can be readily verified that cascading the RAKE with pulse-multipath channel 16 yields a discrete-time equivalent channel with taps $\{\alpha_{u,l}(n)\}$ corresponding to user u per finger l, and that summing over n captures the IFI.

Seemingly infinite, the number of IFI-inducing frames in equation (3) is actually finite. This is because the discrete-time equivalent channel is of finite length, as is the underlying physical channel 16. Indeed, for any u and l, $\alpha_{u,l}(n) := 0$, if $nT_f + \tau(l) \geq \tau_u(L_u) + T_p$. Therefore, the discrete-time equivalent channel $\{\alpha_{u,l}(n)\}_{n=0}^{M_{u,l}}$ corresponding to user u per finger l has order $$M_{u,l} := \max\{n : \tau(l) + nT_f \leq \tau_u(L_u) + T_p\} \quad (4)$$

Accordingly, equation (3) becomes $$y(k;l) = \sum_{u=0}^{N_u-1} \sqrt{\frac{\varepsilon_u}{N_f}} \sum_{n=0}^{M_{u,l}} \alpha_{u,l}(n) c_u(k-n) s_u\left(\left\lfloor \frac{k-n}{N_f} \right\rfloor\right) + \eta(k;l), \quad (5)$$

$$\forall l \in [1, L].$$

IFI is present as long as the maximum channel order is greater than 0. Selecting $T_f \geq \max_u\{\tau_u(L_u)\} + T_p - \tau(1)$ causes $M_{u,l} = 0, \forall u, l$ and IFI to vanish. When IFI involves more than one symbol, inter-symbol interference (ISI) emerges on top of IFI. However, it can be verified that ISI is confined to two consecutive symbols as long as $\max_u\{\tau_u(L_u)\} + T_p - \tau(1) \leq T_s$.

The latter is satisfied in a low power, low duty-cycle UWB system, because $T_s = N_f N_p T_p$ is generally much greater than the channel's maximum delay spread (30-100 ns). For notational simplicity, it is assumed herein that this condition is satisfied. In other embodiments, the analysis can be generalized to cases where this condition is not satisfied.

The correlator outputs corresponding to the same finger l from the frames conveying the $n_s$th symbol may be stacked to form the block $y(n_s;l) := [y(n_s N_f; l), \ldots, y(n_s N_f + N_f - 1; l)]_T$. To collect all the information related to the $n_s$th symbol, concatenate vectors $\{y(n_s;l)\}_{l=1}^{L}$ from all RAKE fingers into a super vector $y(n_s) := [y^T(n_s;1), \ldots, y^T(n_s;L)]^T$ of size $N_f L \times 1$. The super vector can be expressed as $$y(n_s) = \sum_{u=0}^{N_u-1} \sqrt{\frac{\varepsilon_u}{N_f}} H_u^{(0)} v_u(n_s) + \sum_{u=0}^{N_u-1} \sqrt{\frac{\varepsilon_u}{N_f}} H_u^{(1)} v_u(n_s-1) + \eta(n_s), \quad (6)$$

where the $N_f \times 1$ block $v_u(n) := c_u s_u(n)$ is the nth symbol spread over $N_f$ frames, $\eta(n_s)$ is the $N_f L \times 1$ noise vector associated with the $n_s$th symbol, and $H_u^{(0)} := [H_{u,1}^{(0)T}, \ldots, H_{u,L}^{(0)T}]^T$ and $H_u^{(1)} := [H_{u,1}^{(1)T}, \ldots, H_{u,L}^{(1)T}]^T$. $H_{u,l}^{(0)}$ is a $N_f \times N_f$ lower triangular Toeplitz matrix with first column $[\alpha_{u,l}(0), \ldots, \alpha_{u,l}(M_{u,l}), 0, \ldots, 0]^T$ and $H_{u,l}^{(1)}$ is a $N_f \times N_f$ upper triangular Toeplitz matrix with first row $[0, \ldots, 0, \alpha_{u,l}(M_{u,l}), \ldots, \alpha_{u,l}(1)]$. The ISI has given rise to an inter-block interference (IBI) term (second term in equation (6)).

Targeting block by block detection, IBI (and thus ISI) needs to be removed. From the definition of $M_{u,l}$ in equation (4), it follows that the maximum discrete-time equivalent channel order is $M_1 = \max_{u,l}\{M_{u,l}\}$. Consequently, padding each block $v_u(n)$ with $M_1$ zero-guards allows the channel to settle down before the next block/symbol arrives, and thus eliminates the IBI terms of all users in UWB system 10. Zero-padding (ZP) each block $v_u(n)$ with $M_1$ trailing zeros prior to transmission, the I/O relationship in equation (6) simplifies to an IBI-free relationship $$y_{zp} = \sum_{u=0}^{N_u-1} \sqrt{\frac{\varepsilon_u}{N_f}} \bar{H}_u v_u + \eta, \quad (7)$$

where the index $n_s$ is dropped for notational simplicity, and $\bar{H}_u := [\bar{H}_{u,1}^T, \ldots, \bar{H}_{u,L}^T]^T$ is the $LN_1 \times N_f$ channel matrix with $N_1 := N_f + M_1$. The lth block of the channel matrix $\bar{H}_{u,l}^T$ is a $N_1 \times N_f$ lower triangular Toeplitz matrix with the first column given by $$[\alpha_{u,l}(0), \ldots, \alpha_{u,l}(M_{u,l}), 0, \ldots, 0]^T.$$

An alternative way to eliminate IBI is by adding a cyclic prefix (CP) of length $M_1$ at transmitter 12 and removing it at receiver 14, much like OFDMA. Since only the first $M_1$ elements per block are contaminated by IBI, redundancy can be introduced at the transmission and discarded upon reception. In this case, the I/O relationship becomes $$y_{cp} = \sum_{u=0}^{N_u-1} \sqrt{\frac{\varepsilon_u}{N_f}} \bar{H}_u v_u + \eta, \quad (8)$$

where the channel matrix is $\bar{H}_u := [\bar{H}_{u,1}^T, \ldots, \bar{H}_{u,L}^T]^T$. By inserting and removing CP, each block of the channel matrix $\bar{H}_{u,l}^T$ becomes a $N_f \times N_f$ column-wise circulant matrix with the first column given by $[\alpha_{u,l}(0), \ldots, \alpha_{u,l}(M_{u,l}), 0, \ldots, 0]^T$.

Equations (7) and (8) describe, in a discrete-time frame-rate sampled form, the aggregate pulse-multipath-RAKE model in the presence of IFI. Equations (7) and (8) also show that frame-by-frame RAKE correlator samples obey a matrix-vector I/O relationship free of IBI (ISI) even in dense multipath channels, provided that suitable guards (zero-padding or cyclic prefix) are inserted in UWB transmissions.

The techniques described herein may be applied to uplink and/or downlink UWB transmissions, i.e., transmissions from a base station to a mobile device and vice versa. Consequently, transmitter 12 and receiver 14 may be any device configured to communicate using a wireless transmission including a distribution station, a hub for a wireless local area network, a mobile phone, a laptop or handheld computing device, a device within a wireless personal area network, a device within a sensor network, a personal digital assistant (PDA), or other device. Communication channel 6 may be any UWB channel.

Figure 2:
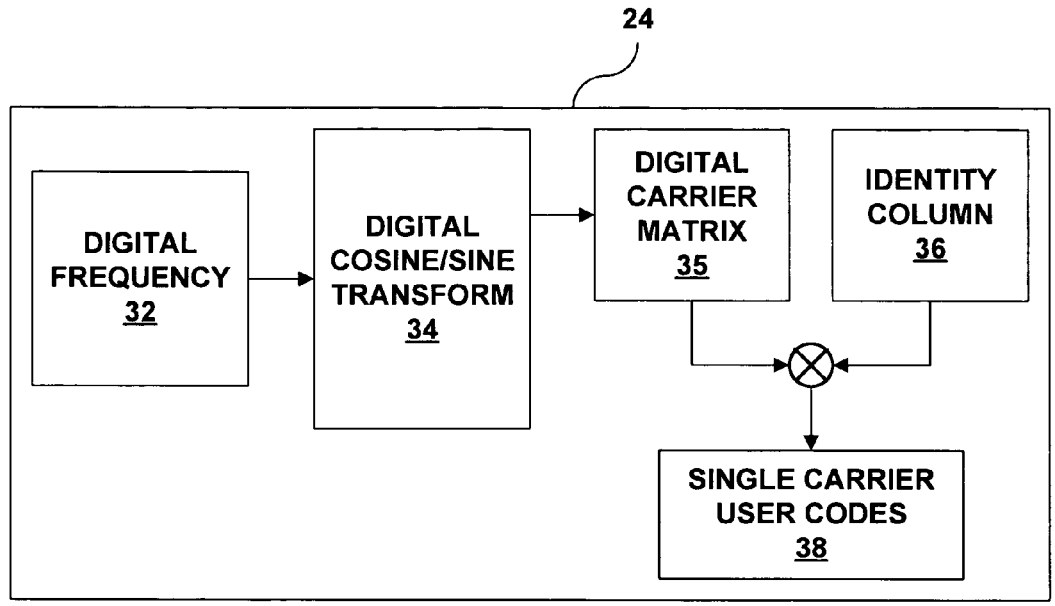
FIG. 2 is a block diagram illustrating a single carrier user code generator.

FIG. 2 is a block diagram illustrating a single carrier (SC) user code generator 24. SC user code generator 24 may be included in a transmitter of a UWB system, substantially similar to user code generator 18 within UWB system 10 from FIG. 1. SC user code generator 24 generates single digital carrier multi-band user codes for a UWB signal. In an UWB system including single carrier user codes, each user in the UWB system is assigned a single digital carrier. However, each of the single digital carriers occupies multiple frequency bands.

SC user code generator 24 includes a digital frequency, $f_u$, 32, which is generated for the uth user in an UWB system. Digital frequency 32 remains the same over all frames of the user's transmitted signal. Digital frequency 32 is applied to a digital cosine/sine transform 34 also included in SC user code generator 24. Discrete cosine or sine functions allow low-complexity user code implementation by SC user code generator 24. Digital cosine/sine transform 34 may comprise a conventional discrete cosine transform (DCT). Digital cosine/sine transform 34 defines $N_u = N_f$ digital carriers $$[g_u]_k = \begin{cases} \sqrt{2}\cos(2\pi f_u k), & \text{if } u \in \left[0, \frac{N_f}{2} - 1\right] \\ \sqrt{2}\sin(2\pi f_u k), & \text{if } u \in \left[\frac{N_f}{2}, N_f - 1\right] \end{cases}, \quad (9)$$

$$\forall k \in [0, N_f - 1],$$

where digital frequency 32 $f_u := (u+0.5)/N_f$, $\forall u \in [0, N_f-1]$.

The $N_f$ carriers output from digital cosine/sine transform 34 are stacked into a digital carrier matrix 35 $G_{sc} := [g_0 \ldots g_{N_f-1}]$. SC user code generator 24 combines digital carrier matrix 35 with identity column, $e_n$, 36. Identity column 36 comprises the (n+1)st column of the identity matrix $I_{N_f}$. In this way, SC user code generator 24 constructs SC-UWB user codes 38 as $$c_u = G_{sc} e_u, \quad \forall u \in [0, N_f-1], \quad (10)$$

where $c_u := [c_u(0), \ldots, c_u(N_f-1)]^T$. Combining digital carrier matrix 35 with identity column 36 assigns a single digital carrier to the uth user of the UWB system. A baseband SC spreading code during the kth frame may be given by $c_u(k) = [g_u]_k$. Therefore, the uth user relies on digital frequency, $f_u$, 32 to spread symbols of the baseband signal. Since the digital SC spreading codes 38 are orthogonal, the maximum number of users in the UWB system is $N_u = N_f$. A transmitter that includes SC user code generator 24 then applies SC user codes 38 to transmit the uth user's signal.

Different from narrowband OFDMA, SC user codes 38 in equation (10) are baseband real. More importantly, in ultra-wideband operation, SC spreading codes 38 result in multi-band transmissions, which is very different from conventional code division multiple access (CDMA) systems. Utilizing a single digital "carrier" $f_u$, each user's transmission occupies multiple frequency bands. Also, introducing a 0.5/$N_f$ shift in the definition of $f_u$ in equation (9) allows each user or subcarrier to occupy the same bandwidth.

The multi-band feature of SC-UWB implies that each user's transmission is spread over the ultra-wide bandwidth, and enjoys the associated multipath diversity gains. In fact, the baseband real SC-UWB codes 38 in equation (10) enable full multipath diversity, in contrast with narrowband OFDMA systems that have to resort to channel coding and/or frequency hopping to mitigate frequency-selective fading at the expense of bandwidth overexpansion. Since the transmit spectrum is distinctly determined by the digital carrier $f_u$, SC-UWB gains resilience to NBI by simply avoiding usage of carriers residing on or close to narrowband services.

Figure 3:
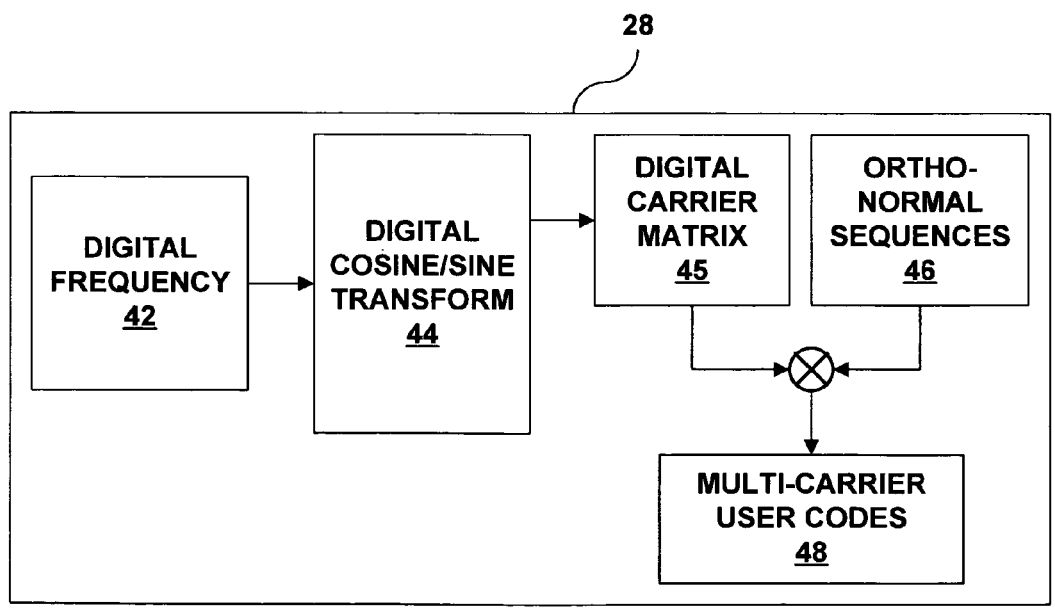
FIG. 3 is a block diagram illustrating a multi-carrier user code generator.

FIG. 3 is a block diagram illustrating a multi-carrier (MC) user code generator 28. MC user code generator 28 may be included in a transmitter of an UWB system, substantially similar to user code generator 18 within UWB system 10 from FIG. 1. MC user code generator 28 generates multiple digital carrier multi-band user codes for an UWB signal. In an UWB system including multi-carrier user codes, each user in the UWB system is assigned a different combination of digital carriers. Furthermore, each of the digital carriers included in the combination occupies multiple frequency bands.

MC user code generator 28 includes a digital frequency, $f_n$, 42, which is generated for the nth subcarrier in an UWB system. Digital frequency 42 remains the same over all frames of a transmitted signal. Digital frequency 42 is applied to a digital cosine/sine transform 44 also included in MC user code generator 28. Discrete cosine or sine functions allow low-complexity user code implementation by MC user code generator 28. Digital cosine/sine transform 44 may comprise a conventional discrete cosine transform (DCT). Digital cosine/sine transform 44 defines $N_f \times 1$ digital carriers $$[\bar{g}_n]_k = \begin{cases} \cos(2\pi f_n k), & n = 0, \text{ or } n = \frac{N_f}{2} \\ \sqrt{2}\cos(2\pi f_n k), & n \in \left[1, \frac{N_f}{2} - 1\right] \\ \sqrt{2}\sin(2\pi f_n k), & n \in \left[\frac{N_f}{2} + 1, N_f - 1\right] \end{cases}, \quad (11)$$

$$\forall k \in [0, N_f - 1]$$

where digital frequency 42 $f_n := n/N_f$.

The $N_f$ carriers output from digital cosine/sine transform 44 are stacked into a digital carrier matrix 45 $G_{mc} := [\bar{g}_0 \ldots \bar{g}_{N_f-1}]$. MC user code generator 28 combines digital carrier matrix 45 with orthonormal sequence, $c_u^{(o)}$, 46. Orthonormal sequences $\{c_u^{(o)}\}_{u=0}^{N_f-1}$ denote any set of real orthonormal sequences each of length $N_f$. In this way, MC user code generator 28 constructs $N_u(=N_f)$ user-specific MC-UWB user codes 48 as $$c_u = G_{mc} c_u^{(o)}, \forall u \in [0, N_f-1], \quad (12)$$

where $c_u := [c_u(0), \ldots, c_u(N_f-1)]^T$. Combining digital carrier matrix 45 with orthonormal sequence 46 assigns a combination of digital carriers to the uth user of the UWB system. Unlike SC-UWB, described above, in MC-UWB, each user can utilize all the digital carriers. Therefore, each user of the UWB system may be assigned a different combination of digital carriers based on the orthonormal sequence 46 generated for the user. Since the digital MC spreading codes 48 are orthogonal, the maximum number of users in the UWB system is $N_u = N_f$. A transmitter that includes MC user code generator 28 then applies MC user codes 48 to transmit the uth user's signal.

Similar to SC-UWB, described above, the digital carriers from equation (11) also give rise to multi-band transmissions. Also similar to SC-UWB, each MC carrier has a distinct frequency support, which enables flexible NBI suppression by simply avoiding contaminated carriers.

Though similar, SC user codes 38 and MC user codes 48 are designed differently. The digital carriers of SC user codes 38 include a shift of $0.5/N_f$ in $f_u$ from equation (9), but the digital carriers of MC user codes 48 do not include a shift in $f_n$ from equation (11). Therefore, each user or subcarrier in MC-UWB may not necessarily occupy the same bandwidth. However, since MC-UWB allows each user to utilize all carriers with MC user codes 48 in equation (12), there is no need to equate the bandwidth of each carrier.

Despite their differences, SC and MC user codes are both constructed based on discrete cosine/sine functions, which facilitates low-complexity implementation using standard DCT circuits. The implementation advantage distinguishes the user codes from analog SC-UWB user codes that aim to offer robustness against user asynchronism. Also different from the WirelessPAN multi-band proposals that rely on analog carriers, the SC and MC codes presented herein achieve multi-band transmission using baseband operations. Compared to analog multi-band solutions that entail multiple local oscillators, the analog carrier-free multi-band SC- and MC-UWB not only include low-complexity implementation, but are also exempt from carrier frequency offsets that are known to severely degrade performance.

Figure 4:
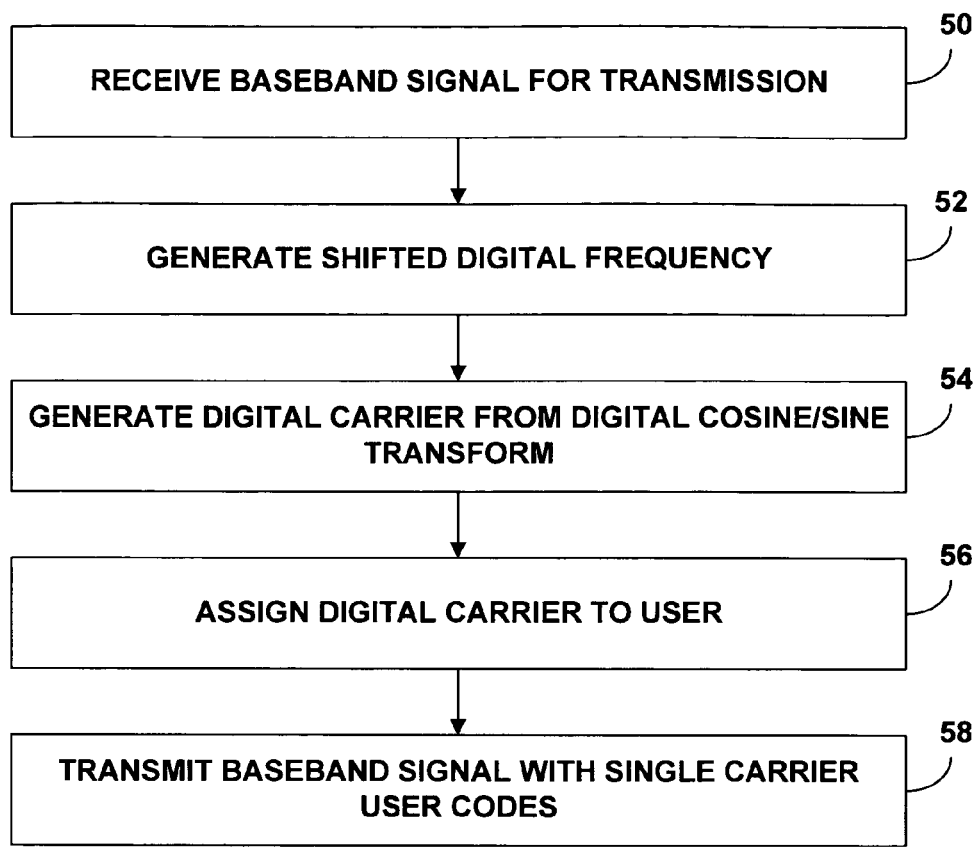
FIG. 4 is a flow chart illustrating a method for generating single carrier multi-band user codes to transmit an ultra-wideband signal of a user in a UWB system.

FIG. 4 is a flow chart illustrating a method for generating single carrier (SC) multi-band user codes to transmit an ultra-wideband (UWB) signal of a user in a UWB system. The method may be applied to a UWB transmitter including a SC user code generator, such as SC user code generator 24 illustrated in FIG. 2. In other embodiments, the SC user code generator may be located external to a UWB transmitter.

An UWB transmitter receives a baseband signal of a user for transmission over an UWB system (50). SC user code generator 24 generates a shifted digital frequency, $f_u$, 32 for the uth user in the UWB system (52). Digital frequency 32 is applied to a digital cosine/sine transform 34 within SC user code generator 24. Digital cosine/sine transform 34 generates a digital carrier, $g_k$, for the uth user (54). The digital carrier is assigned to the user by combining a digital carrier matrix 35 with an identity matrix column 36 corresponding to the user (56). The UWB transmitter then applies the digital carrier to the user's baseband signal and transmits the baseband signal with the single carrier user codes 38 (58).

Figure 5:
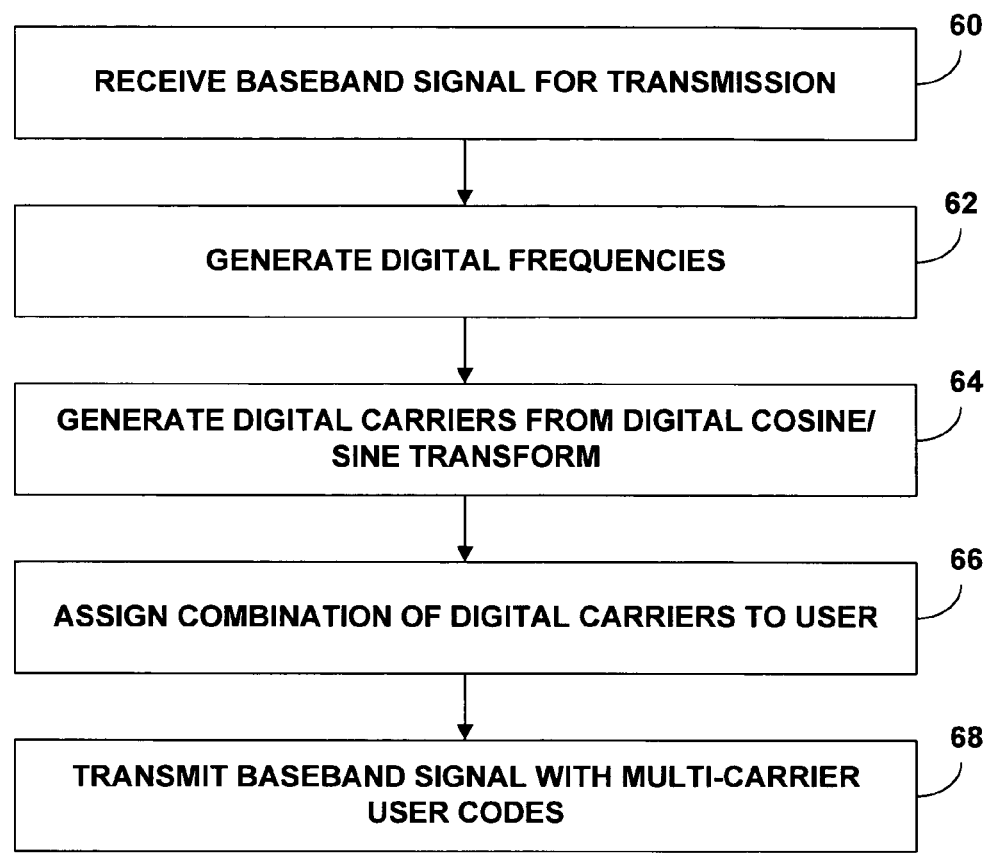
FIG. 5 is a flow chart illustrating a method for generating multi-carrier multi-band user codes to transmit an ultra-wideband signal of a user in a UWB system.

FIG. 5 is a flow chart illustrating a method for generating multi-carrier (MC) multi-band user codes to transmit an ultra-wideband (UWB) signal of a user in a UWB system. The method may be applied to a UWB transmitter including a MC user code generator, such as MC user code generator 28 illustrated in FIG. 3. In other embodiments, the MC user code generator may be located external to a UWB transmitter.

An UWB transmitter receives a baseband signal of a user for transmission over an UWB system (60). MC user code generator 28 generates a digital frequency, $f_n$, 42 for the nth subcarrier in the UWB system (62). Digital frequency 42 is applied to a digital cosine/sine transform 44 within MC user code generator 44. Digital cosine/sine transform 44 generates $N_f$ digital carriers, $\bar{g}_k$ (64). A combination of the digital carriers are assigned to the uth user by combining a digital carrier matrix 45 with an orthonormal sequence 46 (66). The UWB transmitter then applies the combination of digital carrier to the user's baseband signal and transmits the baseband signal with the multi-carrier user codes 48 (68).

Figure 6:
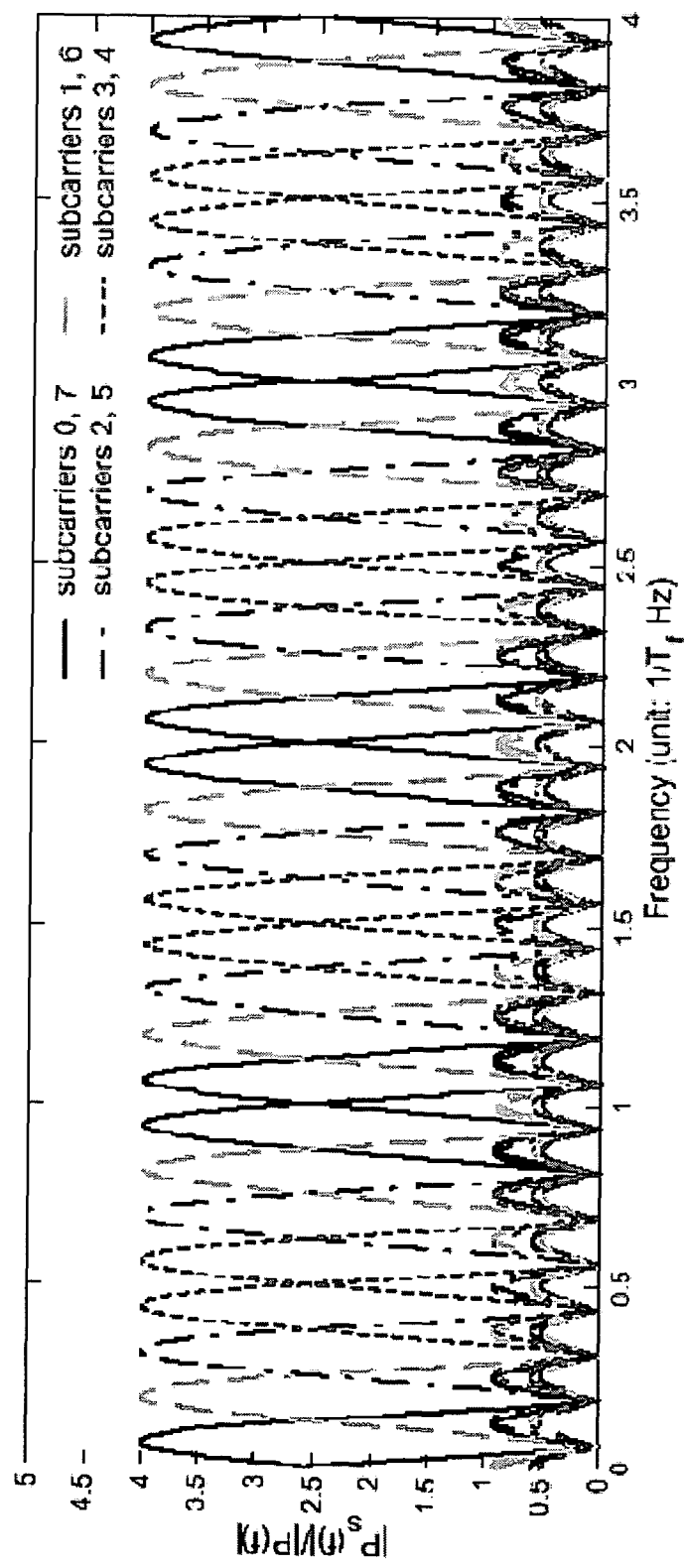
FIG. 6 is a plot illustrating digital carriers from baseband single carrier user codes defined in reference to FIG. 2.

FIG. 6 is a plot illustrating digital carriers from baseband single carrier (SC) user codes 38 defined in reference to FIG. 2. As shown in FIG. 6, SC user codes 38 from equation (10) result in multi-band transmissions. In the illustrated embodiment, there are $N_f=8$ frames. Since SC spreading codes 38 are orthogonal, the system may include a maximum of $N_u=N_f=8$ users. In the case of single carrier user codes described herein, the number of users is also equal to the number of digital carriers.

When SC user codes 38 of equation (10) are utilized, deriving the power spectral density (PSD) of $x_u(t)$ in equation (1) reveals the multi-band feature of SC-UWB. For equiprobable binary PAM symbols, the PSD of $x_u(t)$ in equation (1) can be expressed as $$\Phi_{xx}^{(u)}(f) = \frac{\varepsilon_u}{N_f} \frac{1}{T_s} |P_{s,u}(f)|^2, \quad (13)$$

where $P_{s,u}(f) := F\{p_{s,u}(t)\}$ is the Fourier Transform (FT) of the symbol level pulse shaper $$p_{s,u}(t) := \sum_{k=0}^{N_f-1} c_u(k) p(t - kT_f).$$

With SC spreading codes 38 in equation (10), it can be readily verified that $$P_{s,u}(f) = P(f) \sum_{k=-\infty}^{+\infty} S\left(f - \frac{k}{T_f} - \frac{f_u}{T_f}\right) \pm S\left(f - \frac{k}{T_f} + \frac{f_u}{T_f}\right), \quad (14)$$

where $P(f) := F\{p(t)\}$, and $S(f) := (T_s/\sqrt{2}) \exp(-j\pi T_s f) \sin c(T_s f)$, with sin $c(f) := \sin(\pi f)/(\pi f)$. The '+' sign between the two S( ) terms in equation (14) corresponds to users $u \in [0, N_f/2-1]$, while the '−' sign corresponds to users $u \in [N_f/2, N_f-1]$.

The non-zero frequency support of $P(f)$ is inversely proportional to the pulse duration $T_p$; whereas the sin c function has main lobe width ($2/T_s$) Hz, and is repeated every ($1/T_f$) Hz. Letting $N_p:=T_f/T_p$ be an integer, it may be deduced that there are $2N_p$ sin c main lobes over the bandwidth of P(f). In UWB transmissions that typically have low duty-cycle, $T_f>>T_p$ implies that the number of sin c main lobes $2N_p>>2$. In other words, utilizing a single digital "carrier" $f_u$, each user's transmission occupies multiple frequency bands, as shown in FIG. 6. Also notice that introducing a $0.5/N_f$ shift in the definition of $f_u$ in equation (9), each user or subcarrier occupies the same bandwidth.

As illustrated in FIG. 6, subcarriers 0 and 7 occupy the same frequency bands; however, according to equation (9), subcarrier 0 comprises a cosine function and subcarrier 7 comprises a sine function. Therefore, subcarriers 0 and 7 are orthogonal and do not interfere with each other. Subcarriers 1 and 6, subcarriers 2 and 5, and subcarriers 3 and 4, also illustrated in FIG. 6, operate in a substantially similar manner.

The multi-band feature of SC-UWB implies that each user's transmission is spread over the ultra-wide bandwidth, and enjoys the associated multipath diversity gains. In fact, the baseband real SC-UWB codes 38 in equation (10) enable full multipath diversity. Since the transmit spectrum is distinctly determined by the digital carrier $f_u$, SC-UWB gains resilience to NBI by simply avoiding usage of carriers residing on or close to these narrowband services.

Figure 7:
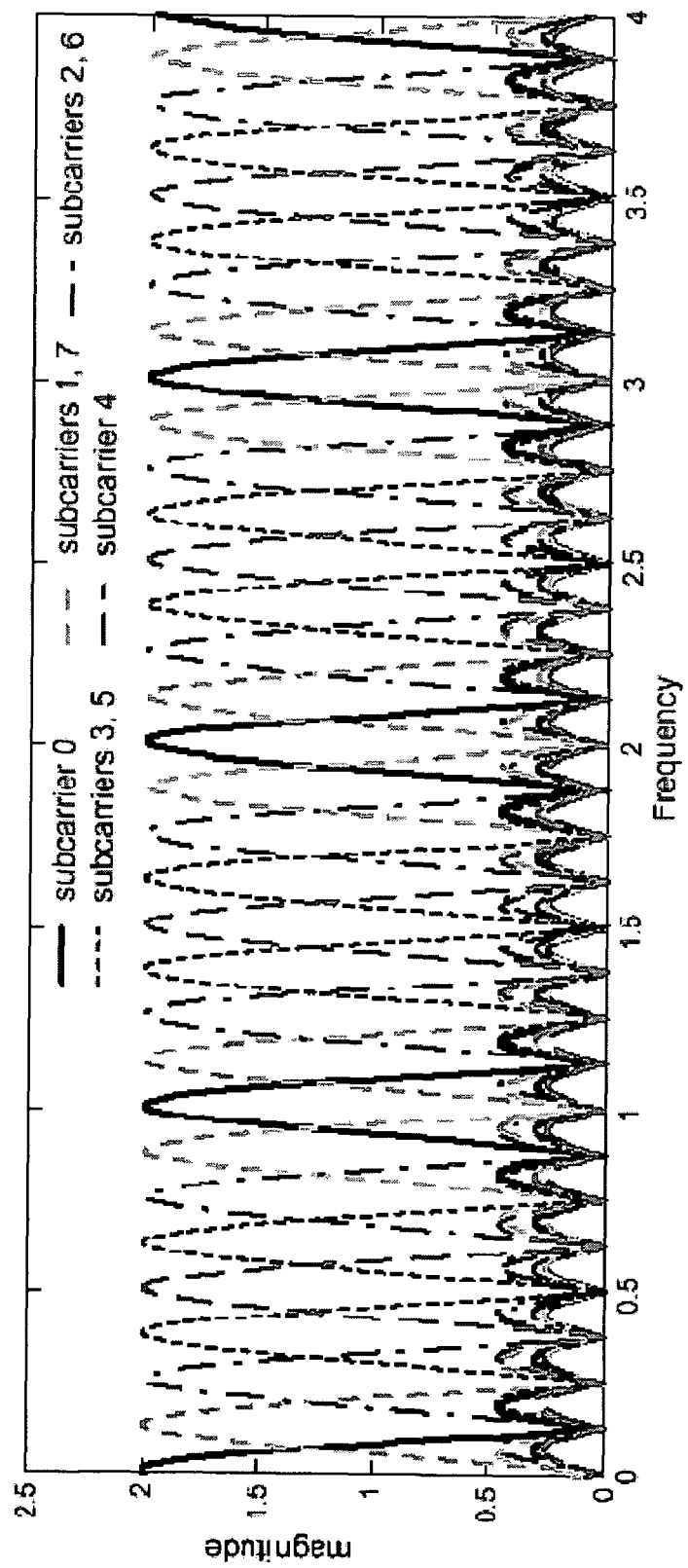
FIG. 7 is a plot illustrating digital carriers from baseband multi-carrier user codes defined in reference to FIG. 3.

FIG. 7 is a plot illustrating digital carriers from baseband multi-carrier (MC) user codes 48 defined in reference to FIG. 3. Similar to SC-UWB, described above, the digital carriers from equation (11) also give rise to multi-band transmissions with multiple sin c main lobes within the frequency support of P(f). This multi-band feature of MC-UWB is illustrated by the discrete-time Fourier Transform (DTFT) of $\bar{g}_k$'s in FIG. 7. Also similar to SC-UWB, each MC carrier has a distinct frequency support, which enables flexible NBI suppression by simply avoiding contaminated carriers.

Though similar, SC user codes 38 and MC user codes 48 are designed differently. The digital carriers of SC user codes 38 include a shift of $0.5/N_f$ in $f_u$ from equation (9), but the digital carriers of MC user codes 48 do not include a shift in $f_n$ from equation (11). The difference becomes evident when comparing FIG. 6 and FIG. 7. Chosen for SC-UWB as in equation (9), each digital carrier corresponds to the same number of sin c main lobes ($2N_p=8$ in FIG. 6); whereas chosen for MC-UWB as in equation (11), the 0th and the 4th carriers each contains only half as many sine main lobes as other carriers (shown in FIG. 7).

Consequently, specializing equation (11) to SC transmissions by setting $c_u^{(o)}=e_u$ will induce unbalanced user bandwidth, which implies user-dependent multipath diversity. However, since MC-UWB allows each user to utilize all carriers with the MC codes in equation (12), there is no need to equate the bandwidth of each carrier.

As illustrated in FIG. 7, subcarriers 1 and 7 occupy the same frequency bands; however, according to equation (11), subcarrier 1 comprises a cosine function and subcarrier 7 comprises a sine function. Therefore, subcarriers 1 and 7 are orthogonal and do not interfere with each other. Subcarriers 2 and 6 and subcarriers 3 and 5, also illustrated in FIG. 7, operate in a substantially similar manner.

In order to quantify diversity and coding gains for a particular user, set $N_u=1$ and assume $\{\alpha_{u,l}\}_{l=1}^{L}:=[\alpha_{u,l}(0), \ldots, \alpha_{u,l}(M_{u,l})]^T$ are perfectly know at the receiver. As an example, consider an UWB system with parameters $N_f$, $T_f$ and $T_p$, and L-finger RAKE reception with $L \leq L_u$ and delays $\{\tau(l)\}_{l=1}^{L}$ spaced at least $2T_p$ apart. With the equivalent channel order $M_{u,l}$ as in equation (4), the maximum achievable diversity order is $$G_{d,max} = \frac{1}{2}\sum_{l=1}^{L}(M_{u,l}+1). \quad (15)$$

With maximum diversity gain $G_{d,max}$ being achieved, the maximum coding gain is $$G_{c,max} := d_{min}^2 \left[ \prod_{l=1}^{L} \prod_{m=0}^{M_{u,l}} A_{u,l}(m) \right]^{1/(2G_{d,max})}, \quad (16)$$

where $A_{u,l}(m):=E\{\alpha_{u,l}^2(m)\}$, and $d_{min}$ is the minimum Euclidean distance of the $s_u$ constellation.

As a further example, along with the conditions set forth above, select $T_f \geq \tau_u(L_u)+T_p-\tau(1)$ to remove IFI. The resulting maximum diversity and coding gains are $G_{d,max}=L/2$ and $G_{c,max}=d_{min}^2[\Pi_{l=1}^{L} A_{u,l}(0)]^{1/(2G_{d,max})}$, respectively. In the case where ZP guards are applied to the UWB system set forth above, IBI removal enables the maximum achievable diversity order $G_{d,zp}=G_{d,max}$ regardless of the spreading codes used. However, achieving maximum coding gain requires the spreading codes to have perfect correlation; therefore, this is not generally guaranteed. In the case where CP guards are applied to the UWB system set forth above, the achievable diversity order depends on the spreading code when IBI is removed.

In general, for a given spreading gain $N_f$, single-user performance heavily depends on UWB spreading code selection. Conventional DS user codes do not guarantee $G_{d,max}$ when CP guards are employed. Even with ZP guards, the error performance with DS codes is suboptimum as $G_{c,max}$ is not guaranteed. On the other hand, the SC and MC user codes defined herein enable maximum diversity order, with ZP or CP guards. In particular, MC-UWB can also achieve $G_{c,max}$ with CP guards and approach $G_{c,max}$ with ZP guards.

In multi-access scenarios, employment of multi-user detection (MUD) approaches generally require knowledge of all users' channels and spreading codes, which is often unrealistic. Moreover, the computational complexity may be prohibitive for the stringent size and power limitations of UWB radios. Relying on simple receiver processing with RAKE reception, single-user matched filter (MF)-RAKE detection using maximum ratio combining (MRC) will be described. Collecting outputs of the RAKE correlators, per frame, the I/O relationship is given by $$y = \sqrt{\frac{\varepsilon_\mu}{N_f}} H_\mu c_\mu s_\mu + \sum_{u \neq \mu} \sqrt{\frac{\varepsilon_u}{N_f}} H_u c_u s_u + \eta. \quad (17)$$

In general, MF-RAKE does not guarantee MUI elimination. However, if CP is coupled with MC spreading codes, it becomes possible to mitigate MUI even with low complexity MF-RAKE. In fact, special choices of $\{c_u^{(o)}\}_{u=0}^{N_f-1}$ can suppress MUI significantly, while maintaining the capability of simultaneously accommodating $N_u=N_f$ active users. In the case of MC-II, where $c_u^{(o)}=e_u$, $\forall u \in [0, N_f-1]$, even with simple MF-RAKE, the number of interfering users is reduced to at most one, as opposed to $N_f-1$. As a result, with low-cost UWB receivers equipped with MF-RAKE, MC-UWB can accommodate $N_f/2+1$ users while still achieving single-user performance. In conventional DS-UWB, single-user performance can be achieved only when one user is active. In typical UWB systems with large $N_f$, this translates to a significant user capacity increase by $N_f/2$.

Reducing the number of interfering users also reduces considerably the complexity of maximum likelihood (ML) detection, and renders it feasible for UWB applications. In the MC-II case, where each user is assigned a single real digital carrier, full diversity is not guaranteed. With each user employing more than one digital carriers, the diversity order can be increased at the price of reduced user capacity or increased MUD complexity. However, different from narrowband OFDMA that has diversity order 1, even with a single carrier chosen from equation (11), the minimum achievable diversity order is L/2.

FIGS. 8-14 are plots illustrating simulations and comparisons using single carrier (SC) and multi-carrier (MC) multi-band user codes for ultra-wideband (UWB) transmissions. FIGS. 8-14 plot average bit-error-rate (BER) vs. $\epsilon_u/N_0$ in decibels (dB). Each symbol in the baseband UWB transmissions contains $N_f=32$ frames, each with $T_f=24$ nanoseconds. The random channels are generated with parameters $(1/\Lambda, 1/\lambda, \Gamma, \gamma) = (2, 0.5, 30, 5)$ ns. The resulting maximum delay spread of the multipath channel is 90 ns. The RAKE receiver uses L=2 fingers per frame, selected randomly but kept fixed for all testing scenarios. Consequently, $M_{\mu,1}=3$ and $MH_{\mu,2}=2$, where $\mu$ is the index of the desired user. Accounting for the ZP or CP guard of length $M_1=3$, the transmission rate is about 1.2 Mbps for binary PAM.

According to equation (15), the maximum achievable diversity order is $$G_{d,max} = \frac{1}{2}\sum_{l=1}^{L}(M_{\mu,l}+1) = 7/2,$$

which is the same as that of a system with L=7 fingers free from IFI. In the presence of IFI, DS-, and SC-UWB may result in diversity order as low as 1, which coincides with that of a system with L=2 fingers in the absence of IFI. Therefore, bit-error-rate (BER) curves corresponding to these two IFI-free systems are plotted as benchmarks in each of FIGS. 8-14. These benchmark curves exhibit both $G_{d,max}$ and $G_{c,max}$.

Figure 8:
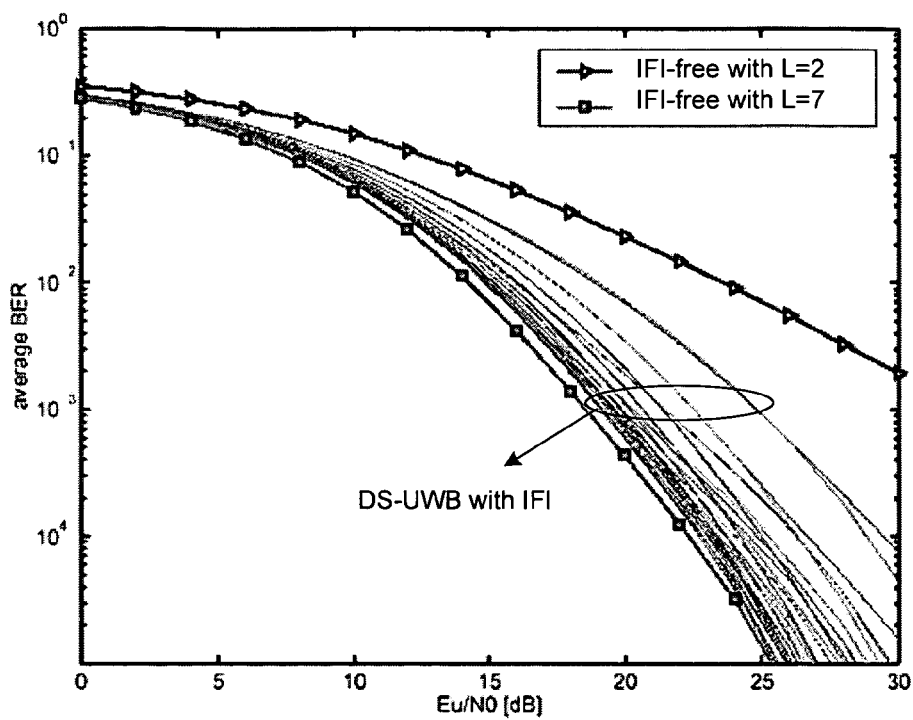
FIGS. 8-14 are plots illustrating simulations and comparisons using single carrier and multi-carrier multi-band user codes for ultra-wideband (UWB) transmissions.
Figure 9:
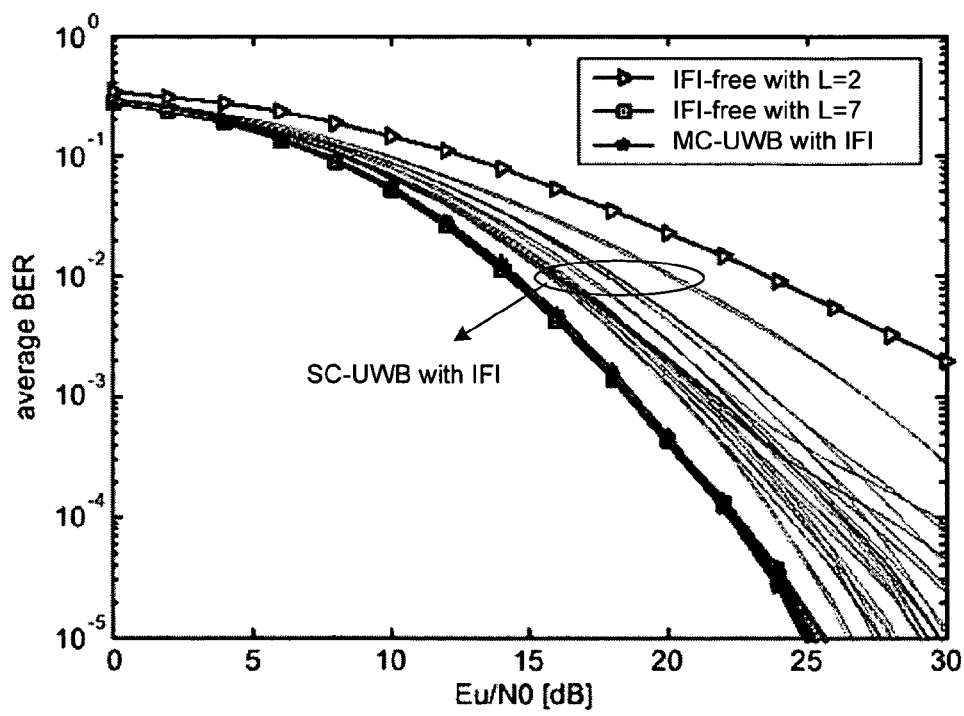

FIG. 8 and FIG. 9 illustrate ML detection applied to decode individual users with ZP guards. Average BER vs. $\epsilon_u/N_0$ with ZP is shown for DS, SC, and MC codes. Walsh-Hadamard codes are used for the DS-UWB in FIG. 8 and also for the $c_u^{(o)}$ part of the MC-UWB in FIG. 9. Although all spreading codes can enable $G_{d,max}=7/2$, the BER curves corresponding to all 32 MC spreading codes are almost identical to the L=7 benchmark performance, as shown in FIG. 9. Both FIGS. 8 and 9 show that the BER curves of both DS and SC spreading codes are distributed over a rather wide range. The performance difference between the codes comes from the discrepancy in the corresponding coding gains. Although the coding gain corresponding to MC-UWB, in this case, is not maximum, the coding gain comes very close to $G_{c,max}$.

Figure 10:
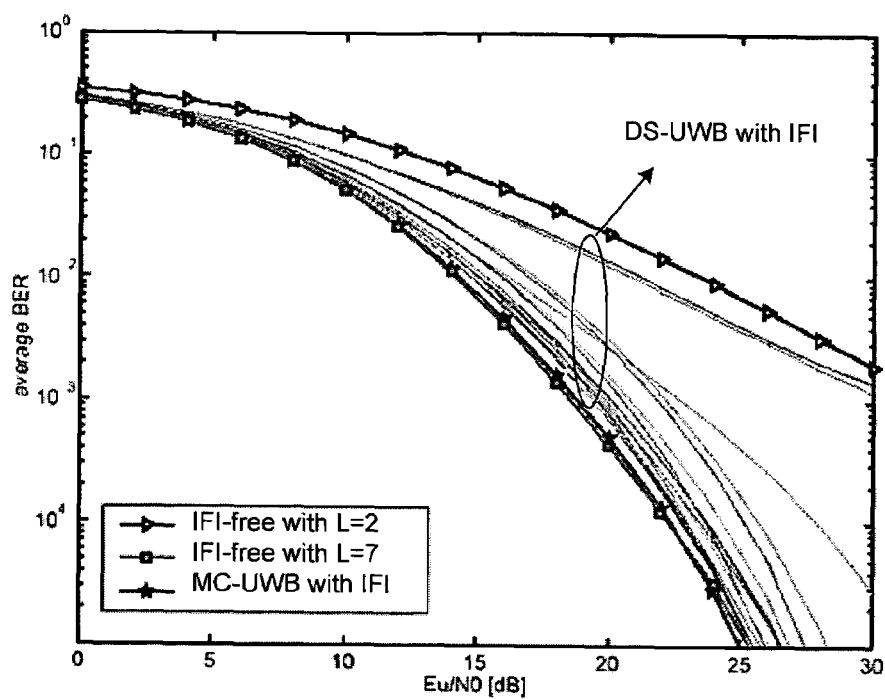
Figure 11:
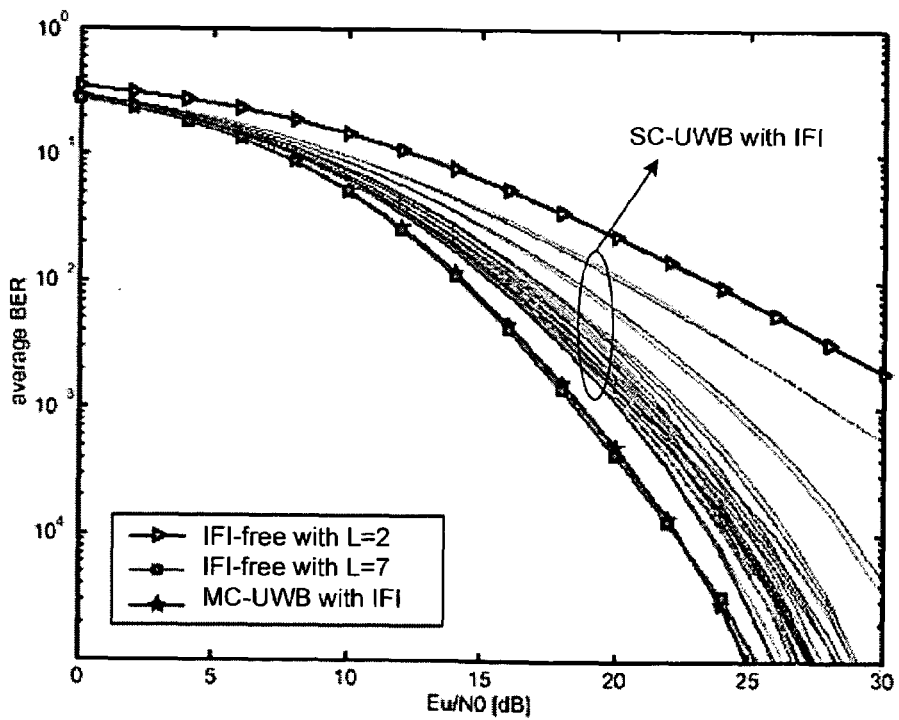
Figure 12:
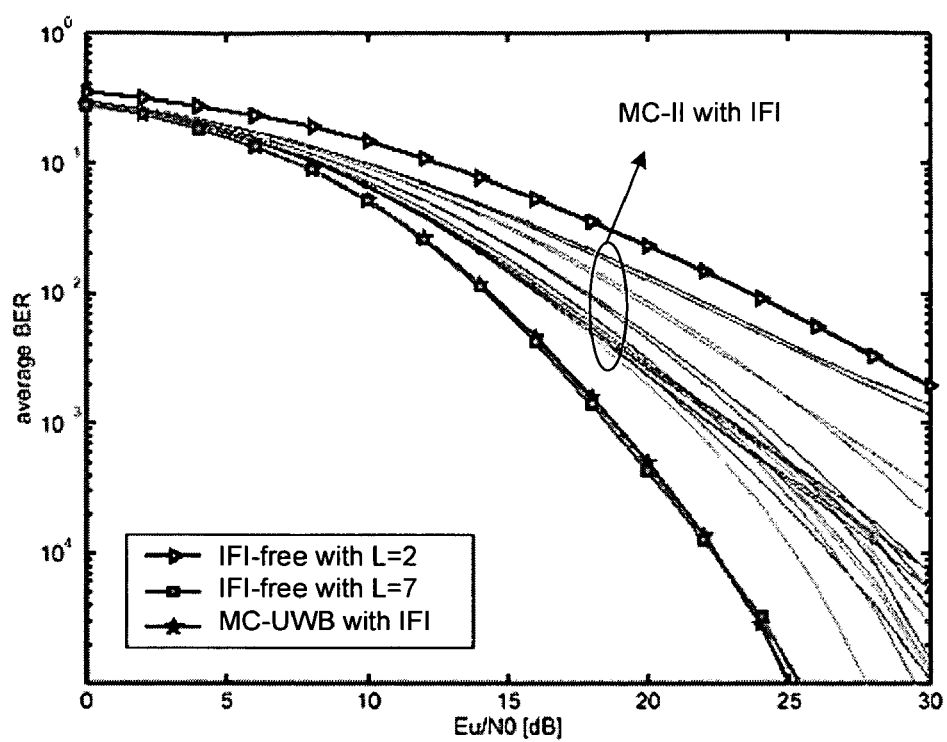

FIGS. 10-12 illustrate ML detection applied to decode individual users with CP guards. Average BER vs. $\epsilon_u/N_0$ with ZP is shown for DS, SC, MC, and MC-II codes. It can be observed from FIGS. 10-12, that MC-UWB with L=2 RAKE fingers in the presence of IFI yields BER curves substantially identical to the L=7 benchmark without IFI. DS-UWB, plotted in FIG. 10, enjoys full diversity for most users, but for some users it exhibits diversity order of only 1. SC-UWB, plotted in FIG. 11, guarantees full diversity, but not maximum coding gain. MC-II, plotted in FIG. 12, exhibits diversity orders ranging from 1 to 2.

Figure 13:
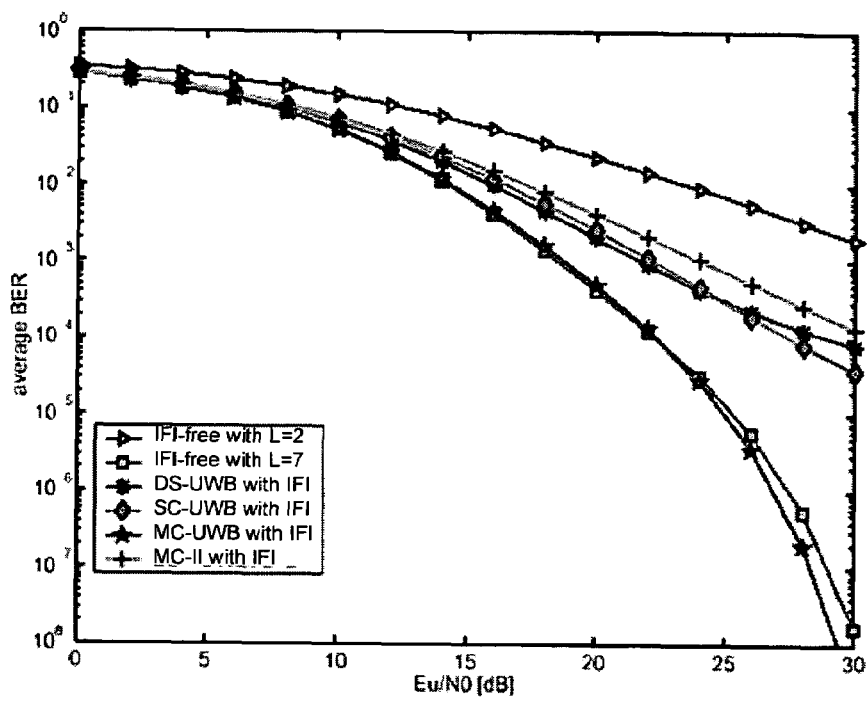
Figure 14:
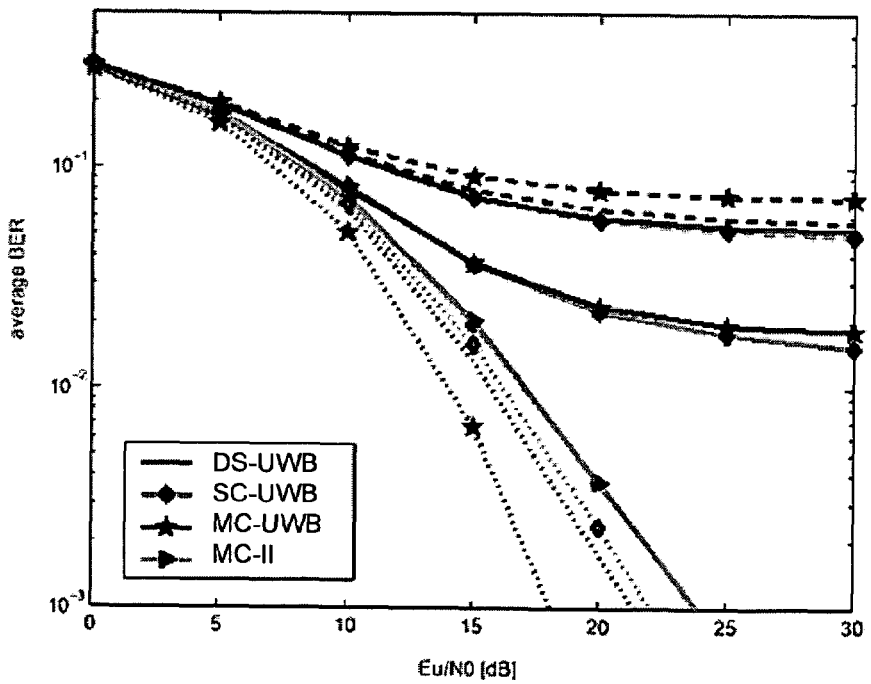

FIG. 13 illustrates the BER averaged over all codes with CP guards used for IBI removal. The plot confirms that MC-UWB outperforms all other spreading codes. FIG. 14 illustrates the BER of MF-RAKE detectors in multi-access UWB with CP guards used for IBI removal. The plot depicts UWB operation under variable user loads: fully loaded with $N_u=32$ users (dashed curves), medium loaded with $N_u=17$ users (solid curves), and lightly loaded with $N_u=1$ (dotted curves). Under light user loads, MC-UWB outperforms all other user codes. In the medium loaded system, the performance of MC-II codes is identical to the single-user case, as expected. In the fully loaded case, all of the spreading codes exhibit error floor. Among all the spreading codes, MC-UWB exhibits highest sensitivity to MUI, possibly because all users have identically flat transmit spectra. For the user codes close to fully loaded systems, the single user RAKE receivers motivated here by complexity considerations are not sufficient to cope with the near-far effects that cause the error floors shown in FIG. 14.

Figure 15:
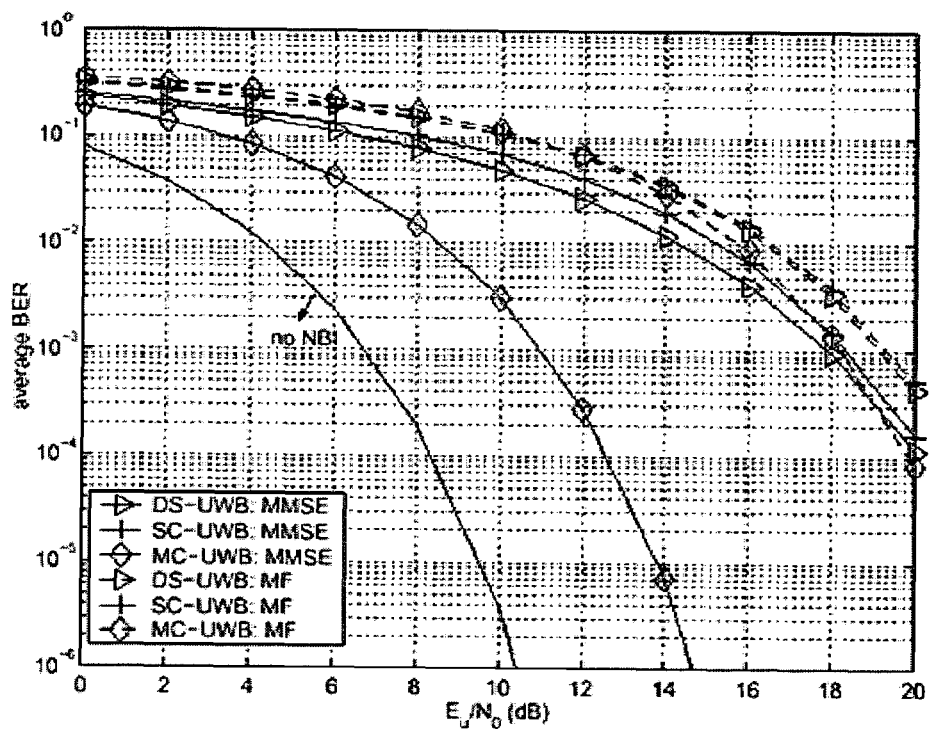
FIGS. 15 and 16 are plots illustrating simulations and comparisons using single carrier and multi-carrier multi-band user codes for ultra-wideband transmissions including narrowband interference.
Figure 16:
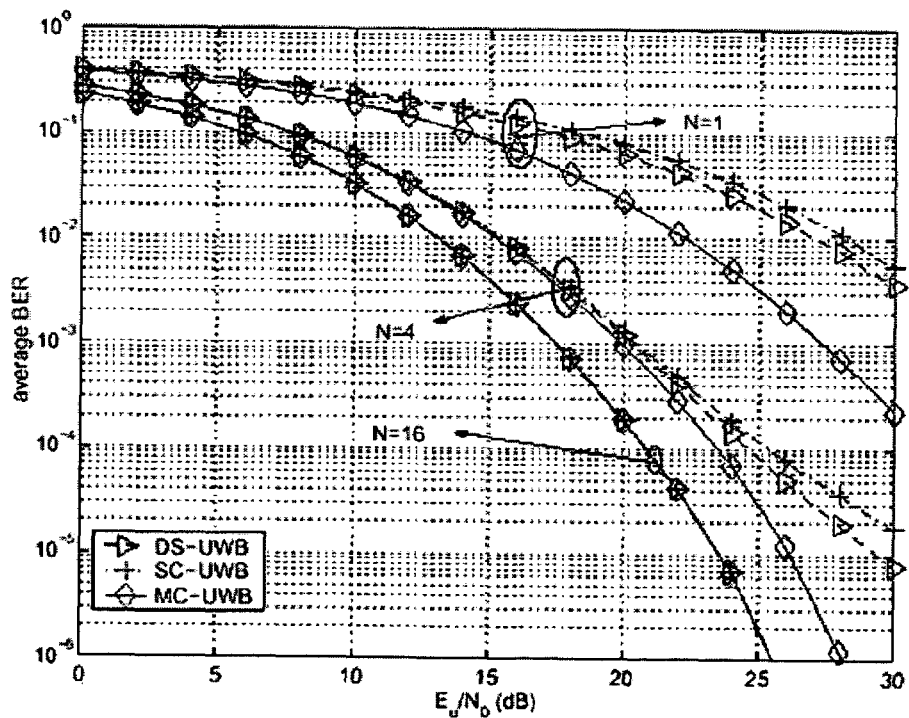

FIGS. 15 and 16 are plots illustrating simulations and comparisons using single carrier (SC) and multi-carrier (MC) multi-band user codes for ultra-wideband (UWB) transmissions including NBI. FIGS. 15 and 16 plot average bit-error-rate (BER) vs. $\epsilon_u/N_0$ in decibels (dB). Each symbol in the baseband UWB transmissions contains $N_f=32$ frames, each with $T_f=35$ nanoseconds. The random channels are generated with parameters $(1/\Lambda, 1/\lambda, \Gamma, \gamma) = (43, 0.4, 7.1, 4.3)$ ns. The resulting maximum delay spread of the multipath channel is 35 ns. The NBI is generated with a center frequency of about 1.2 GHz and a bandwidth of 20 MHz.

FIG. 15 illustrates average BER corresponding to DS, SC, and MC codes with NBI present and multipath absent. Walsh-Hadamard codes are used for the DS-UWB and also for the $c_u^{(o)}$ part of the MC-UWB. FIG. 15 depicts the BER averaged over all spreading codes in AWGN channels with both a minimum mean-square error (MMSE)-RAKE receiver and a selective MF-RAKE receiver. It can be observed that DS- and SC-UWB yield similar performances. On the other hand, MC-UWB outperforms both DS- and SC-UWB for both MMSE and MF receivers.

FIG. 16 illustrates average BER corresponding to DS, SC, and MC codes in multipath channels with NBI. The BER is averaged over all spreading codes in AWGN multipath channels with a selective MF-RAKE receiver with N=1, 4, and 16 fingers. In the presence of both NBI and multipath effects, MC-UWB outperforms both the DS and SC spreading codes. However, the performance difference diminishes as additional RAKE fingers are employed.

Various embodiments of digital carrier multi-band user codes for baseband UWB multiple access have has been described. As one example, a single carrier (SC) user code is described that assigns a single digital carrier to each user in an UWB system. As another example, a multi-carrier (MC) user code is described that assigns a combination of digital carriers to each user in an UWB system. In either case, the user codes are applied to a baseband signal of the user to provide flexibility in handling narrowband interference (NBI) by simply avoiding carriers including the interference.

In addition, with both user codes, the user occupies multiple frequency bands and enjoys full multipath diversity, even with a single digital carrier. Furthermore, MC-UWB achieves maximum coding gain. Finally, even with frame-rate samples and simple matched filtering operations, SC- and MC-UWB are capable of reducing multi-user interference (MUI), which in turn reduces receiver complexity. These and other embodiments are within the scope of the following claims.

The invention claimed is:

1. A method comprising:
generating, in a transmitter device, a set of two or more digital frequencies, wherein each digital frequency corresponds to a subcarrier within an ultra-wideband (UWB) system;
processing, in the transmitter device, the digital frequencies with a digital transform function to generate a plurality of digital carriers, wherein each of the digital carriers occupies multiple frequency bands; and
assigning, in the transmitter device, different combinations of the digital carriers to the users within the UWB system to generate digital carrier multi-band user codes substantially according to the following equations:

$$[\bar{g}_n]_k = \begin{cases} \cos(2\pi f_n k), & \text{if } n = 0 \text{ or } n = \frac{N_f}{2} \\ \sqrt{2} \cos(2\pi f_n k), & \text{if } n \in \left[1, \frac{N_f}{2} - 1\right] \\ \sqrt{2} \sin(2\pi f_n k), & \text{if } n \in \left[\frac{N_f}{2} + 1, N_f - 1\right] \end{cases} \forall k \in [0, N_f - 1],$$

$$f_n = \frac{n}{N_f}, \text{ where}$$

$\bar{g}_n$ comprises digital carriers generated based on a digital frequency $f_n$ for $N_f$ frames of a nth subcarrier's UWB signal, and $[\bar{g}_n]_k$ represents a digital carrier of $\bar{g}_n$ corresponding to the kth frame, and $$c_u = G_{mc} c^{(o)}_u \, \forall u \in [0, N_f - 1],$$

where $c_u$ comprises the digital carrier multi-band user codes for a uth user in the UWB system, $G_{mc}$ is a digital carrier matrix defined as $G_{mc} = [\bar{g}_0 \ldots \bar{g}_{N_f - 1}]$, and
$c^{(o)}_u$ = a set of real orthonormal sequences.

2. The method of claim 1, wherein the user codes comprise spreading codes that enable access for a plurality of users in the UWB system.

3. The method of claim 2, wherein the plurality of users comprises between one and thirty-two users.

4. The method of claim 1, wherein the user codes are orthogonal to one another.

5. The method of claim 1, wherein assigning the different combinations of the digital carriers to the users comprises assigning at least one digital carrier to each user.

6. The method of claim 1, wherein the digital carrier multi-band user codes are multi-carrier codes.

7. The method of claim 1, further comprising selecting a transmission bandwidth for the UWB signal by selecting and rejecting digital carriers.

8. The method of claim 1, further comprising selecting a transmission bandwidth for the UWB signal by rejecting digital carriers that include narrowband interference (NBI).

9. The method of claim 1, further comprising selecting a transmission bandwidth for the UWB signal by selecting a combination of digital carriers that substantially suppresses multi-user interference (MUI).

10. The method of claim 1, wherein processing the digital frequencies comprises processing the digital frequencies with one of a digital cosine transform and a digital sine transform 11. The method of claim 1, further comprising generating periodic user codes with a period approximately equal to the number of frames in a transmitted UWB signal.

12. The method of claim 1, further comprising generating user codes that modify a pulse amplitude of the transmitted UWB signal from frame to frame.

13. The method of claim 1, further comprising applying zero padding (ZP) guards to the user codes.

14. The method of claim 1, further comprising applying cyclic prefix (CP) guards to the user codes.

15. The method of claim 1, wherein assigning the different combinations of the digital carriers to the users comprises assigning a different combination of digital carriers to each user in the UWB system.

16. The method of claim 1, wherein assigning the different combinations of the digital carriers to the users comprises assigning combinations of the digital carriers based on a set of orthonormal sequences.

17. A method comprising:
generating, in a transmitter device, a set of two or more digital frequencies, wherein each digital frequency corresponds to a user within an ultra-wideband (UWB) system;
processing, in the transmitter device, the digital frequencies with a digital transform function to generate a plurality of digital carriers, wherein each of the digital carriers occupies multiple frequency bands; and
assigning, in the transmitter device, the digital carriers to the users within the UWB system to generate digital carrier multi-band user codes substantially according to the following equations:

$$[g_u]_k = \begin{cases} \sqrt{2} \cos(2\pi f_u k), & \text{if } u \in \left[0, \frac{N_f}{2} - 1\right] \\ \sqrt{2} \sin(2\pi f_u k), & \text{if } u \in \left[\frac{N_f}{2}, N_f - 1\right] \end{cases} \forall k \in [0, N_f - 1],$$

$$f_u = \frac{u + 0.5}{N_f},$$

where
$g_u$ comprises digital carriers generated based on a digital frequency $f_u$ for $N_f$ frames of a uth user's UWB signal, and $[g_u]_k$ represents a digital carrier of $g_u$ corresponding to the kth frame, and $$c_u = G_{sc} e_u \, \forall u \in [0, N_f - 1],$$

where $c_u$ comprises the digital carrier multi-band user codes for the uth user, $G_{sc}$ is a digital carrier matrix defined as $G_{sc} = [g_0 \ldots g_{N_f - 1}]$, and $e_u = (u+1)$st column of identity matrix $I_{N_f}$.

18. The method of claim 17, wherein the digital carrier multi-band user codes are single carrier codes.

19. The method of claim 17, wherein each of the digital carriers comprises a shifted digital frequency that allow a digital carrier assigned to the user to occupy the same bandwidth as digital carriers assigned to other user in the UWB system.

20. The method of claim 17, wherein assigning the digital carriers to the users comprises assigning a single digital carrier to each user.

21. A computer readable medium comprising instructions stored therein that, when executed in an ultra wideband (UWB) transmitter, cause the UWB transmitter to:
generate a set of two or more digital frequencies, wherein each digital frequency corresponds to a user within an ultra-wideband (UWB) system;

process the digital frequencies with a digital transform function to generate a plurality of digital carriers, wherein each of the digital carriers occupies multiple frequency bands; and assign the digital carriers to the users within the UWB system to generate digital carrier multi-band user codes substantially according to the following equations:

$$[g_u]_k = \begin{cases} \sqrt{2}\cos(2\pi f_u k), & \text{if } u \in \left[0, \frac{N_f}{2} - 1\right] \\ \sqrt{2}\sin(2\pi f_u k), & \text{if } u \in \left[\frac{N_f}{2}, N_f - 1\right] \end{cases} \forall k \in [0, N_f - 1],$$

$$f_u = \frac{u + 0.5}{N_f},$$

$g_u$ comprises digital carriers generated based on a digital frequency $f_u$ for $N_f$ frames of a uth user's UWB signal, and $[g_u]_k$ represents a digital carrier of $g_u$ corresponding to the kth frame, and $$c_u = G_{sc} e_u \forall u \in [0, N_f - 1],$$

where $c_u$ comprises the digital carrier multi-band user codes for the uth user, $G_{sc}$ is a digital carrier matrix defined as $G_{sc} = [g_0 \ldots g_{N_f-1}]$, and $e_u = (u+1)$st column of identity matrix $I_{N_f}$.

22. The computer readable medium of claim 21, wherein the digital carrier multi-band user codes are single carrier codes.

23. The computer readable medium of claim 21, wherein each of the digital carriers comprises a shifted digital frequency that allows a digital carrier assigned to the user to occupy the same bandwidth as digital carriers assigned to other users in the UWB system.

24. The computer readable medium of claim 21, wherein the instructions that cause the UWB transmitter to assign the digital carriers to the users comprise instructions that, when executed, cause the UWB transmitter to assign a single digital carrier to each user.

25. A computer readable medium comprising instructions stored therein that, when executed in an ultra wideband (UWB) transmitter, cause the UWB transmitter to:

generate a set of two or more digital frequencies, wherein each digital frequency corresponds to a subcarrier within an ultra-wideband (UWB) system;

process the digital frequencies with a digital transform function to generate a plurality of digital carriers, wherein each of the digital carriers occupies multiple frequency bands; and assign different combinations of the digital carriers to the users within the UWB system to generate digital carrier multi-band user codes substantially according to the following equations:

$$[\bar{g}_n]_k = \begin{cases} \cos(2\pi f_n k), & \text{if } n = 0 \text{ or } n = \frac{N_f}{2} \\ \sqrt{2}\cos(2\pi f_n k), & \text{if } n \in \left[1, \frac{N_f}{2} - 1\right] \\ \sqrt{2}\sin(2\pi f_n k), & \text{if } n \in \left[\frac{N_f}{2} + 1, N_f - 1\right] \end{cases} \forall k \in [0, N_f - 1],$$

$$f_n = \frac{n}{N_f},$$

$\bar{g}_n$ comprises digital carriers generated based on a digital frequency $f_n$ for $N_f$ frames of a nth subcarrier's UWB signal, and $[\bar{g}_n]_k$ represents a digital carrier of $\bar{g}_n$ corresponding to the kth frame, and $$c_u = G_{mc} c^{(o)}_u \forall u \in [0, N_f - 1],$$

where $c_u$ comprises the digital carrier multi-band user codes for a uth user in the UWB system, $G_{mc}$ is a digital carrier matrix defined as $G_{mc} = [\bar{g}_0 \ldots \bar{g}_{N_f-1}]$, and $c^{(o)}_u = $ a set of real orthonormal sequences.

26. The computer readable medium of claim 25, wherein the user codes comprise spreading codes that enable access for a plurality of users in the UWB system.

27. The computer readable medium of claim 25, wherein the user codes are orthogonal to one another.

28. The computer readable medium of claim 25, wherein the instructions that cause the UWB transmitter to assign the different combinations of the digital carriers comprise instructions that, when executed, cause the UWB transmitter to assign at least one digital carrier to each user.

29. The computer readable medium of claim 25, wherein the digital carrier multi-band user codes are multi-carrier codes.

30. The computer readable medium of claim 25, further comprising instructions stored therein that, when executed, cause the UWB transmitter to select a transmission bandwidth for the UWB signal by selecting and rejecting digital carriers.

31. The computer readable medium of claim 25, further comprising instructions stored therein that, when executed, cause the UWB transmitter to select a transmission bandwidth for the UWB signal by rejecting digital carriers that include narrowband interference (NBI).

32. The computer readable medium of claim 25, further comprising instructions stored therein that, when executed, cause the UWB transmitter to select a transmission bandwidth for the UWB signal by selecting a combination of digital carriers that substantially suppresses multi-user interference (MUI).

33. The computer readable medium of claim 25, further comprising instructions stored therein that, when executed, cause the UWB transmitter to generate digital carrier multi-band user codes with one of a digital cosine transform and a digital sine transform.

34. The computer readable medium of claim 25, further comprising instructions stored therein that, when executed, cause the UWB transmitter to apply zero padding (ZP) guards to the user codes.

35. The computer readable medium of claim 25, further comprising instructions stored therein that, when executed, cause the UWB transmitter to apply cyclic prefix (CP) guards to the user codes.

36. The computer readable medium of claim 25, wherein the instructions that cause the UWB transmitter to assign the different combinations of the digital carriers to the users comprise instructions that, when executed, cause the UWB transmitter to assign a different combination of digital carriers to each user in the UWB system.

37. The computer readable medium of claim 25, wherein the instructions that cause the UWB transmitter to assign the different combinations of the digital carriers to the users comprise instructions that, when executed, cause the UWB transmitter to assign combinations of digital carriers based on a set of orthonormal sequences.

38. An ultra-wideband (UWB) transmitter device comprising a user code generator that generates a set of two or more digital frequencies, wherein each digital frequency corresponds to a user within an ultra-wideband (UWB) system; processes the digital frequencies with a digital transform function to generate a plurality of digital caters, wherein each of the digital carriers occupies multiple frequency bands; and assigns the digital carriers to the users within the UWB system to generate digital carrier multi-band user codes substantially according to the following equations:

$$[g_u]_k = \begin{cases} \sqrt{2}\cos(2\pi f_u k), & \text{if } u \in \left[0, \frac{N_f}{2} - 1\right] \\ \sqrt{2}\sin(2\pi f_u k), & \text{if } u \in \left[\frac{N_f}{2}, N_f - 1\right] \end{cases} \forall k \in [0, N_f - 1],$$

$$f_u = \frac{u + 0.5}{N_f},$$

$g_u$ comprises digital carriers generated based on a digital frequency $f_u$ for $N_f$ frames of a uth user's UWB signal, and $[g_u]_k$ represents a digital carrier of $g_u$ corresponding to the kth frame, and $$c_u = G_{sc} e_u \ \forall u \in [0, N_f - 1],$$

where $c_u$ comprises the digital carrier multi-band user codes for the uth user, $G_{sc}$ is a digital carrier matrix defined as $G_{sc} = [g_0 \ldots g_{N_f-1}]$, and $e_u = (u+1)$st column of identity matrix $I_{N_f}$.

39. The UWB transmitter device of claim 38, wherein the digital carrier multi-band user codes are single carrier codes.

40. The UWB transmitter device of claim 38, wherein the user code generator assigns a single digital carrier to each user.

41. An ultra-wideband (UWB) transmitter device comprising a user code generator that generates a set of two or more digital frequencies, wherein each digital frequency corresponds to a user within an ultra-wideband (UWB) system, processes the digital frequencies with a digital transform function to generate a plurality of digital carriers, wherein each of the digital carriers occupies multiple frequency bands; and assigns different combinations of the digital carriers to the users within the UWB system to generate digital carrier multi-band user codes substantially according to the following equations:

$$[\bar{g}_n]_k = \begin{cases} \cos(2\pi f_n k), & \text{if } n = 0 \text{ or } n = \frac{N_f}{2} \\ \sqrt{2}\cos(2\pi f_n k), & \text{if } n \in \left[1, \frac{N_f}{2} - 1\right] \\ \sqrt{2}\sin(2\pi f_n k), & \text{if } n \in \left[\frac{N_f}{2} + 1, N_f - 1\right] \end{cases} \forall k \in [0, N_f - 1],$$

$$f_n = \frac{n}{N_f},$$

$\bar{g}_n$ comprises digital carriers generated based on a digital frequency $f_n$ for $N_f$ frames of a nth subcarrier's UWB signal, and $[\bar{g}_n]_k$ represents a digital carrier of $\bar{g}_n$ corresponding to the kth frame, and $$c_u = G_{mc} c^{(o)}_u \ \forall u \in [0, N_f - 1],$$

where $c_u$ comprises the digital carrier multi-band user codes for a uth user in the UWB system, $G_{mc}$ is a digital carrier matrix defined as $G_{mc} = [\bar{g}_0 \ldots \bar{g}_{N_f-1}]$, and $c^{(o)}_u = $ a set of real orthonormal sequences.

42. The UWB transmitter device of claim 41, wherein the user codes comprise spreading codes that enable access for a plurality of users in the UWB system.

43. The UWB transmitter device of claim 41, wherein the plurality of users comprises between one and thirty-two users.

44. The UWB transmitter device of claim 41, wherein the user codes are orthogonal to one another.

45. The UWB transmitter device of claim 41, wherein the user code generator assigns at least one digital carrier to each user.

46. The UWB transmitter device of claim 38, wherein each of the digitals carrier comprises a shifted digital frequency that allows a digital carrier assigned to the user to occupy the same bandwidth as digital carriers assigned to other users in the UWB system.

47. The UWB transmitter device of claim 41, wherein the digital carrier multi-band user codes are multi-carrier codes.

48. The UWB transmitter device of claim 41, wherein the user code generator selects and rejects digital carriers to select a transmission bandwidth for the UWB signal.

49. The UWB transmitter device of claim 41, wherein the user code generator rejects digital carriers that include narrowband interference (NBI) to select a transmission bandwidth for the UWB signal.

50. The UWB transmitter device of claim 41, wherein the user code generator selects a combination of digital carriers that substantially suppresses multi-user interference (MUI) to select a transmission bandwidth for the UWB signal.

51. The UWB transmitter device of claim 41, wherein the user code generator includes one of a digital cosine transform and a digital sine transform to generate digital carrier multi-band user codes.

52. The UWB transmitter device of claim 41, wherein the user codes are periodic with a period approximately equal to the number of frames in the UWB signal.

53. The UWB transmitter device of claim 41, wherein the user codes modify a pulse amplitude of the UWB signal from frame to frame.

54. The UWB transmitter device of claim 41, wherein the user code generator applies zero padding (ZP) guards to the user codes.

55. The UWB transmitter device of claim 41, wherein the user code generator applies cyclic prefix (CP) guards to the user codes.

56. The UWB transmitter device of claim 41, wherein the user code generator assigns a different combination of digital carriers to each user in the UWB system.

57. The UWB transmitter device of claim 41, wherein the user code generator assigns combinations of digital carriers based on a set of orthonormal sequences.

* * * * *

UNITED STATES PATENT AND TRADEMARK OFFICE
CERTIFICATE OF CORRECTION

PATENT NO. : 7,561,613 B2
APPLICATION NO. : 10/953493
DATED : July 14, 2009
INVENTOR(S) : Georgios Giannakis et al.

It is certified that error appears in the above-identified patent and that said Letters Patent is hereby corrected as shown below:

Column 3, line 61: "...the $n_s$ information" should be changed to -- the $n_s$th information --

Column 4, line 31: " $\cdots\{\alpha_u(l)\}_{l=0}^{L_u}$ " should be changed to -- $\{\alpha_u(l)\}_{l=0}^{L_u}$ --

Column 4, line 31: " $\cdots\{\mathcal{T}_u(l)\}_{l=0}^{L_u}$ " should be changed to -- $\{\mathcal{T}_u(l)\}_{l=0}^{L_u}$ --

Column 5, line 2: " $\cdots\{\mathcal{T}(l)\}_{l=1}^{L}$ " should be changed to -- $\{\mathcal{T}(l)\}_{l=1}^{L}$ --

Column 5, line 11: " $\cdots\{\mathcal{T}(l)\}_{l=1}^{L}$ " should be changed to -- $\{\mathcal{T}(l)\}_{l=1}^{L}$ --

Column 5, line 59, Equation (5): " $\cdots\{\alpha_{u,l}(n)\}_{n=0}^{M_{u,l}}$ " should be changed to -- $\{\alpha_{u,l}(n)\}_{n=0}^{M_{u,l}}$ --

Column 6, line 10: " $\cdots y(n_s, l) := [y(n_s, N_f; l), \ldots, y(n_s, N_f + N_f - 1; l)]_T$ " should be changed to -- $y(n_s; l) := \left[ y(n_s N_f; l), \ldots, y(n_s N_f + N_f - 1; l) \right]^T$ --

Column 6, line 12: " $\cdots\{y(n_s, l)\}_{l=1}^{L}$ " should be changed to -- $\{y(n_s, l)\}_{l=1}^{L}$ --

Signed and Sealed this
Fourteenth Day of June, 2016

Michelle K. Lee
*Director of the United States Patent and Trademark Office*

CERTIFICATE OF CORRECTION (continued)

U.S. Pat. No. 7,561,613 B2

Column 6, line 28: "$H_u^{(0)} := [H_{u,l}^{(0)T}, \ldots, H_{u,L}^{(0)T}]^T$" should be changed to -- $H_u^{(0)} := \left[ H_{u,1}^{(0)T}, \ldots, H_{u,L}^{(0)T} \right]^T$ --

Column 7, line 8: "$\tilde{H}_u := [\tilde{H}_{u,l}^T, \ldots, \tilde{H}_{u,L}^T]^T$" should be changed to -- $\tilde{H}_u := \left[ \tilde{H}_{u,l}^T, \ldots, \tilde{H}_{u,L}^T \right]^T$ --

Column 7, line 10: "$\tilde{H}_{u,l}^T$" should be changed to -- $\tilde{H}_{u,l}^T$ --

Column 9, line 5: "$\{c_u^{(o)}\}_{u=0}^{N_f-1}$" should be changed to -- $\{c_u^{(o)}\}_{u=0}^{N_f-1}$ --

Column 11, line 61: "$\{\alpha_{u,l}\}_{l=1}^L$" should be changed to -- $\{\alpha_{u,l}\}_{l=1}^L$ --

Column 11, line 62: "...perfectly know" should be changed to -- perfectly known --

Column 11, line 64: "$\{\tau(l)\}_{l=1}^L$" should be changed to -- $\{\tau(l)\}_{l=1}^L$ --

Column 12, line 60: "$\{c_u^{(o)}\}_{u=0}^{N_f-1}$" should be changed to -- $\{c_u^{(o)}\}_{u=0}^{N_f-1}$ --

Column 14, line 53: "...access have has been" should be changed to -- access have been --

Column 16, line 55: "...frequency that allow" should be changed to -- frequency that allows --

Column 19, line 1: "... digital caters" should be changed to -- digital carriers --